United States Patent
Tange et al.

(10) Patent No.: US 12,455,922 B2
(45) Date of Patent: *Oct. 28, 2025

(54) CONTENT PROVIDING SYSTEM, CONTENT PROVIDING METHOD, AND STORAGE MEDIUM

(71) Applicant: Sony Group Corporation, Tokyo (JP)

(72) Inventors: Akira Tange, Tokyo (JP); Hideo Nagasaka, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,125

(22) Filed: Oct. 17, 2024

(65) Prior Publication Data
US 2025/0036680 A1 Jan. 30, 2025

Related U.S. Application Data

(63) Continuation of application No. 17/775,586, filed as application No. PCT/JP2020/043424 on Nov. 20, 2020, now Pat. No. 12,164,563.

(30) Foreign Application Priority Data

Dec. 6, 2019 (JP) ................................. 2019-221523

(51) Int. Cl.
*G06F 16/00* (2019.01)
*G06F 16/635* (2019.01)
(Continued)

(52) U.S. Cl.
CPC .......... *G06F 16/686* (2019.01); *G06F 16/635* (2019.01); *G06Q 30/0251* (2013.01)

(58) Field of Classification Search
CPC .............................. G06F 16/686; G06F 16/635
See application file for complete search history.

(56) References Cited

U.S. PATENT DOCUMENTS 7,466,823 B2 * 12/2008 Vestergaard .......... H04L 63/062
380/231
9,256,647 B2 * 2/2016 Umeda ............. G06F 16/24578
(Continued)

FOREIGN PATENT DOCUMENTS

JP 2006-295799 A 10/2006
JP 2011-166833 A 8/2011
(Continued)

OTHER PUBLICATIONS

International Search Report and Written Opinion mailed on Feb. 9, 2021, received for PCT Application PCT/JP2020/043424, Filed on Nov. 20, 2020, 8 pages.

*Primary Examiner* — Noosha Arjomandi
(74) *Attorney, Agent, or Firm* — XSENSUS LLP

(57) ABSTRACT

There is provided a content providing system in which a script that is generated by a creator and includes identification information of content and comment information is stored in a predetermined storage medium to be browsable by a user, the content providing system including a control unit that performs control to execute reading, according to a script selected by the user, content indicated by content identification information included in the script by using a right that the user has already obtained by a contract with a specific service, and provide the content to the user, and control to read a comment according to the comment information included in the script and provide the comment to the user at least one of before or after the provision of the content, in which the control unit controls the provision of the content or the comment according to a context of the user.

20 Claims, 29 Drawing Sheets

(51) Int. Cl.
*G06F 16/68* (2019.01)
*G06Q 30/0251* (2023.01)

(56) References Cited

U.S. PATENT DOCUMENTS

| | | | |
|---|---|---|---|
| 2004/0057348 A1* | 3/2004 | Shteyn | G11B 27/329 369/30.38 |
| 2004/0133855 A1* | 7/2004 | Blair | H04N 21/4782 715/236 |
| 2007/0091357 A1* | 4/2007 | Konno | G06F 16/48 358/1.15 |
| 2007/0260460 A1* | 11/2007 | Hyatt | H04M 1/7243 704/260 |
| 2008/0177782 A1 | 7/2008 | Poston et al. | |
| 2008/0256109 A1* | 10/2008 | Irvin | G06F 16/637 707/999.102 |
| 2010/0082349 A1* | 4/2010 | Bellegarda | G10L 13/08 704/260 |
| 2010/0107082 A1* | 4/2010 | Ban | H04N 21/4325 715/733 |
| 2011/0211728 A1 | 9/2011 | Inose | |
| 2012/0143701 A1* | 6/2012 | Reis | G06Q 30/0277 705/14.73 |
| 2013/0262118 A1* | 10/2013 | Saeki | G05B 15/02 704/260 |
| 2013/0262458 A1* | 10/2013 | Saito | G11B 27/031 707/731 |
| 2014/0019446 A1* | 1/2014 | He | G06F 16/9535 707/727 |
| 2015/0248272 A1* | 9/2015 | Saeki | G06F 3/165 700/94 |
| 2015/0338917 A1* | 11/2015 | Steiner | H04M 1/72412 345/156 |
| 2016/0327922 A1* | 11/2016 | Sekiguchi | H04N 21/4223 |
| 2019/0206399 A1* | 7/2019 | Garmark | G10L 15/22 |
| 2020/0042584 A1* | 2/2020 | Vennix | G06F 40/103 |
| 2021/0004128 A1* | 1/2021 | Carrigan | H04L 67/1097 |
| 2021/0161482 A1* | 6/2021 | Aizawa | A61B 5/7278 |
| 2022/0391440 A1* | 12/2022 | Tange | G10L 13/08 |
| 2022/0391441 A1* | 12/2022 | Tange | G10K 15/02 |
| 2023/0353843 A1* | 11/2023 | Tange | H04N 21/8456 |

FOREIGN PATENT DOCUMENTS

| | | |
|---|---|---|
| JP | 2015-60545 A | 3/2015 |
| JP | 2015-518171 A | 6/2015 |
| JP | 2016-100033 A | 5/2016 |
| JP | 2017-162006 A | 9/2017 |
| JP | 2018-125856 A | 8/2018 |

* cited by examiner

FIG. 15

| EXCLUSIVE RELATIONSHIP | TYPE OF ACTION | TYPE OF SENSOR |
|---|---|---|
| A | STATIONARY | ACCELERATION SENSOR |
| A | TEMPORARILY STOPPED | ACCELERATION SENSOR |
| B | WALKING | ACCELERATION SENSOR |
| B | RUNNING | ACCELERATION SENSOR |
| B | JUMPING | ACCELERATION SENSOR |
| C | SITTING | ACCELERATION SENSOR |
| C | STANDING | ACCELERATION SENSOR |
| D | ASCENDING IN ELEVATOR | ACCELERATION SENSOR |
| D | DESCENDING IN ELEVATOR | ACCELERATION SENSOR |
| D | RIDING ON TRAIN | ACCELERATION SENSOR |
| E | TURNING RIGHT | ACCELERATION SENSOR AND GYRO SENSOR |
| E | TURNING LEFT | ACCELERATION SENSOR AND GYRO SENSOR |

CONTENT PROVIDING SYSTEM, CONTENT PROVIDING METHOD, AND STORAGE MEDIUM

CROSS-REFERENCE TO RELATED APPLICATIONS

The present application is a continuation of U.S. application Ser. No. 17/775,586, filed May 10, 2022, which is based on PCT filing PCT/JP2020/043424, filed Nov. 20, 2020, which claims priority to JP 2019-221523, filed Dec. 6, 2019, the entire contents of each are incorporated herein by reference.

TECHNICAL FIELD

The present technology relates to a content providing system, a content providing method, and a storage medium, and particularly relates to a content providing system, a content providing method, and a storage medium capable of more appropriately providing content and a comment thereof together.

BACKGROUND ART

In recent years, with diversification of methods for providing content, various services and devices have been provided (see, for example, Patent Documents 1 to 3).

Patent Document 1 discloses a device that, while listening to a song with a portable music player and in a case where the song is of a specific artist, provides information by avoiding a timing at which a user wants to concentrate on content by suspending breaking news and then performing voice synthesis when the song is ended.

Patent Document 2 discloses an advertisement distribution device that cancels distribution of an advertisement during viewing of content.

Patent Document 3 discloses a device that switches content when a degree of concentration of a viewer is reduced, and resumes reproduction of original content when the degree of concentration returns.

CITATION LIST

Patent Document

Patent Document 1: Japanese Patent Application Laid-Open No. 2006-295799
Patent Document 2: Japanese Patent Application Laid-Open No. 2018-125856
Patent Document 3: Japanese Patent Application Laid-Open No. 2016-100033

SUMMARY OF THE INVENTION

Problems to be Solved by the Invention

Meanwhile, when a comment regarding content or the like is provided together with the content, it is required to more appropriately provide the content and the comment thereof.

The present technology has been made in view of such a situation, and makes it possible to more appropriately provide content and a comment thereof together.

Solutions to Problems

A content providing system according to one aspect of the present technology is a content providing system in which a script that is generated by a creator and includes identification information of content and comment information is stored in a predetermined storage medium to be browsable by a user, the content providing system including a control unit that performs control to execute reading, according to a script selected by the user, content indicated by content identification information included in the script by using a right that the user has already obtained by a contract with a specific service, and provide the content to the user, and control to read a comment according to the comment information included in the script and provide the comment to the user at least one of before and after the provision of the content, in which the control unit controls the provision of the content or the comment according to a context of the user.

A content providing method according to one aspect of the present technology is a content providing method in which a script that is generated by a creator and includes identification information of content and comment information is stored in a predetermined storage medium to be browsable by a user, the content providing method including performing control to execute reading, according to a script selected by the user, content indicated by content identification information included in the script by using a right that the user has already obtained by a contract with a specific service, and provide the content to the user, control to read a comment according to the comment information included in the script and provide the comment to the user at least one of before or after the provision of the content, and control of the provision of the content or the comment according to a context of the user.

A storage medium according to one aspect of the present technology is a storage medium recording a program in which a script that is generated by a creator and includes identification information of content and comment information is stored in a predetermined storage medium to be browsable by a user, the program causing a computer to function as a control unit that performs control to execute reading, according to a script selected by the user, content indicated by content identification information included in the script by using a right that the user has already obtained by a contract with a specific service, and provide the content to the user, and control to read a comment according to the comment information included in the script and provide the comment to the user at least one of before or after the provision of the content, in which the control unit controls the provision of the content or the comment according to a context of the user.

In the content providing system, the content providing method, and the storage medium according to one aspect of the present technology, a script that is generated by a creator and includes identification information of content and comment information is stored in a predetermined storage medium to be browsable by a user, control is performed to execute reading, according to a script selected by the user, content indicated by content identification information included in the script by using a right that the user has already obtained by a contract with a specific service, and provide the content to the user, and control is performed to read a comment according to the comment information included in the script and provide the comment to the user at least one of before and after the provision of the content. Furthermore, the provision of the content or the comment is controlled according to the context of the user.

BRIEF DESCRIPTION OF DRAWINGS

FIG. 15 is a diagram illustrating an example of a user context.

MODE FOR CARRYING OUT THE INVENTION

Hereinafter, embodiments of the present technology will be described with reference to the drawings. Note that the description will be made in the following order.

1. First embodiment: reproduction control function according to user context (basic configuration)
2. Second embodiment: reproduction control function corresponding to listening while doing something and concentrated listening
3. Third embodiment: subtitle control function according to user context
4. Fourth embodiment: automatic generation function of new script
5. Fifth embodiment: voice skipping function according to surrounding user attribute
6. Modification example
7. Configuration of computer <Representative Diagram>

Figure 1:
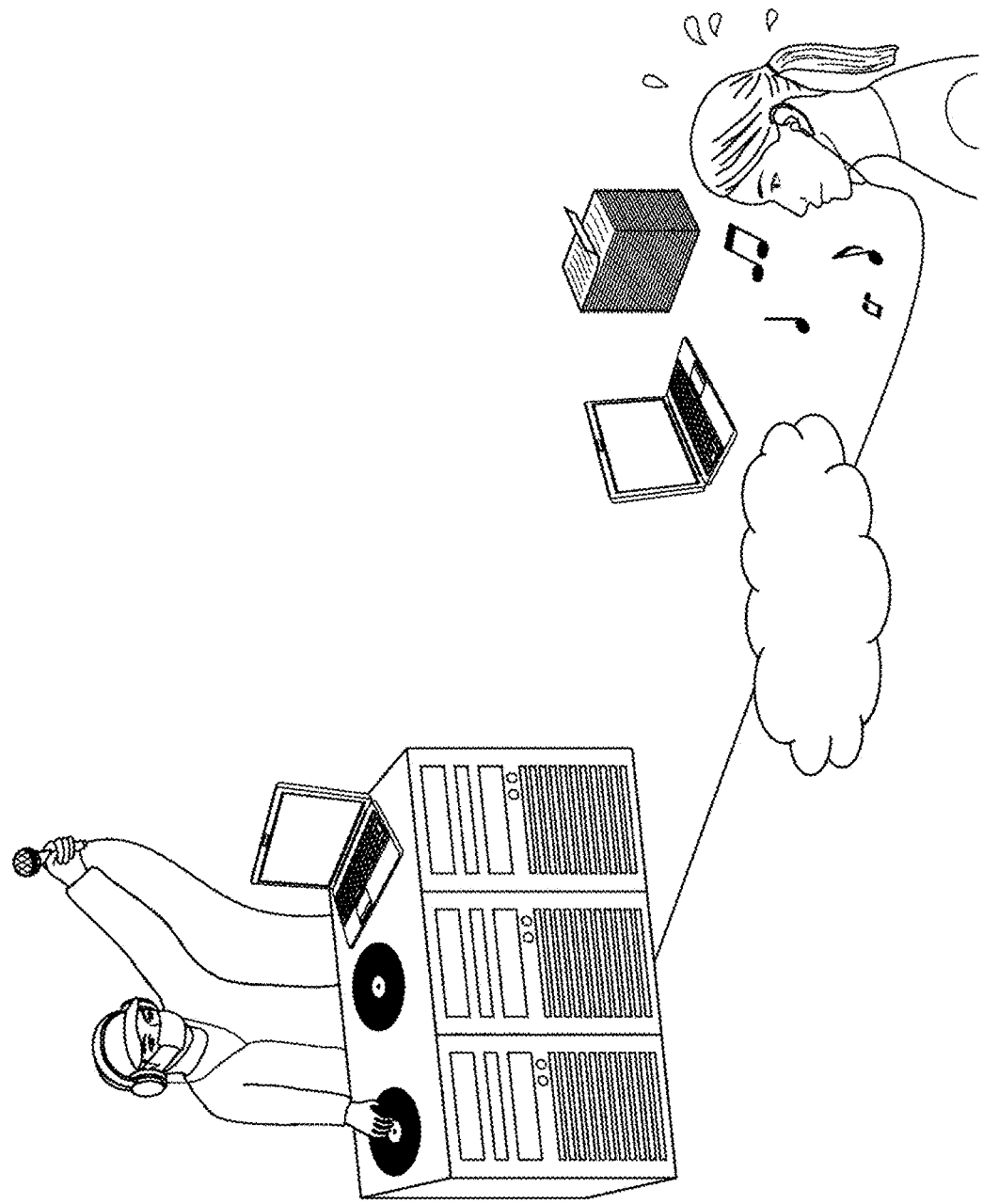
FIG. 1 is a representative diagram illustrating an outline of the present technology.

FIG. 1 is a representative diagram illustrating an outline of the present technology.

The present technology provides content and a comment more appropriately by providing content and a comment regarding the content or the like together using the context of the user in programing the content.

In FIG. 1, a DJ distributes a song selected by himself or herself from a song distribution server and transmits a comment on the song using a microphone. On the other hand, a user listens to the song selected by the DJ and the transmitted comment distributed from the song distribution server.

Here, the DJ is assumed to be a virtual one created by a creator. For example, when the user is busy at work, the DJ provides the user with a song (BGM or the like) selected by the DJ by using a music distribution service that the user has already contracted, but by preventing the DJ from transmitting comments, the user can concentrate on working while listening to the song of BGM or the like.

1. First Embodiment (Outline of Virtual Podcast System)

Figure 2:
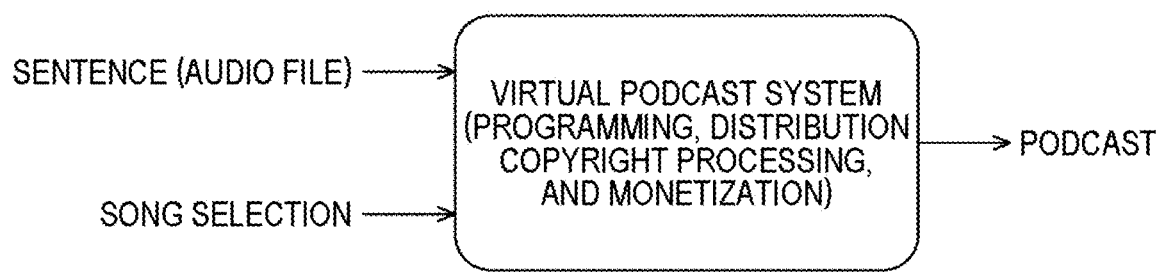
FIG. 2 is a diagram illustrating an outline of a content providing system to which the present technology is applied.

FIG. 2 illustrates an outline of a content providing system to which the present technology is applied. In the example of FIG. 2, a virtual podcast system is illustrated as an embodiment of the content providing system to which the present technology is applied.

The virtual podcast system is a system in which a creator can create a podcast program simply by operating his or her terminal device to select song and write a sentence. Podcasting is one of methods for disclosing audio and video data files on the Internet, and is a kind of Internet radio and Internet television. Note that the sentence is not limited to text, and may be provided as a voice file.

The podcast program created by the creator is registered in a distribution server. Thus, the user can operate the user's own terminal device and reproduce the podcast program distributed from the distribution server, so as to view or listen to the program.

Meanwhile, from the creator who distributes the podcast program, he or she would like to efficiently distribute the podcast program created by himself or herself to allow more users to view or listen to the podcast program.

Furthermore, in a case where a song is distributed through the podcast, copyright processing of the song occurs for the creator who performs the distribution, and thus such work is troublesome for the creator. Accordingly, he or she may want another person to perform copyright processing of the song on his or her behalf.

In recent years, in a video distribution site, a creator opens his or her own video distribution channel and transmits information through video content of various themes, and the creator obtains, as a reward for providing the video content to users, a reward such as advertisement revenue according to the number of times of reproduction of a video, or advertisement revenue due to creation of a tie-up video with an advertiser.

Also for the creator who distributes the podcast program, rewards for the podcast program created by himself or herself is an extremely important concern, and he or she would want to have returns of appropriate rewards.

The above-described programing, distribution copyright processing, and monetization are matters that cannot be avoided for creators who distribute podcast programs, and a mechanism for easily solving these matters is demanded. The virtual podcast system provides a mechanism for responding to requests for programming, distribution copyright processing, and monetization by creators while allowing creators to create and distribute podcast programs so that users can view or listen to the podcast programs.

Figure 3:
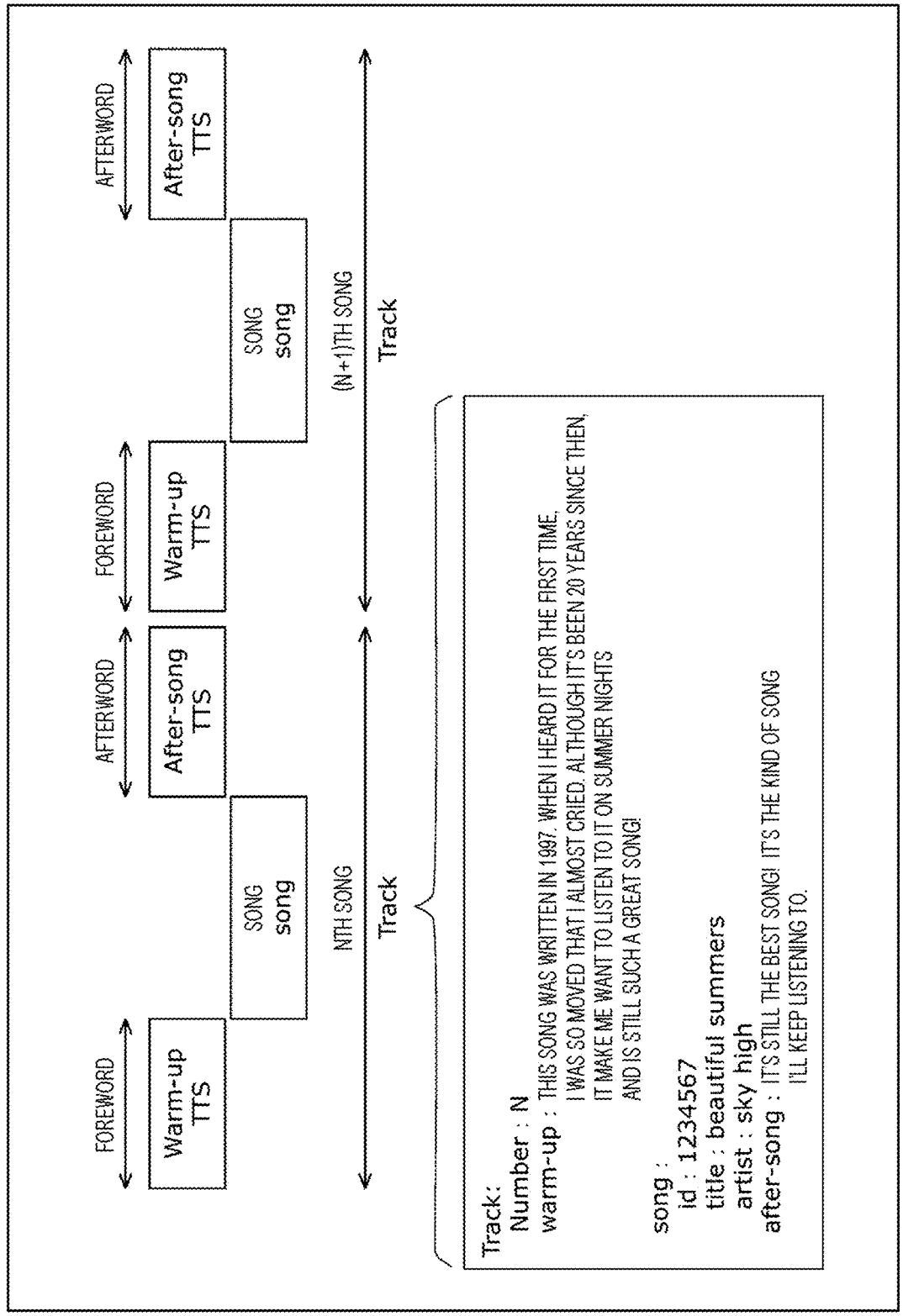
FIG. 3 is a diagram illustrating a flow of content reproduction by the content providing system to which the present technology is applied.

FIG. 3 illustrates a reproduction flow of a podcast program generated by the virtual podcast system.

FIG. 3 illustrates an Nth track and a (N+1)th track that are temporally continuous among tracks included in the podcast program.

Each track includes a foreword (warm-up), a song, and an afterword (after-song).

The foreword introduces the song and includes a text (sentence). In this example, as the foreword, a text "this song was written on . . . , still such a great song!" is described. The text corresponding to this foreword can be converted into a voice by text-to-speech (TTS) and read.

The song includes identification information (id) for identifying the song, and information regarding a title (title) and an artist name (artist) of the song. For example, by using the song ID of "1234567", streaming distribution of the song specified by the song ID can be requested to the music distribution service contracted by the user.

The afterword is a description after the song is listened and includes a text (sentence). In this example, as the afterword, a text "It's still the best song . . . " is described. The text corresponding to this afterword can be read using the TTS.

Here, upon distributing a podcast program, the following two cases are assumed as the right processing for including the song in the program.

Figure 4:
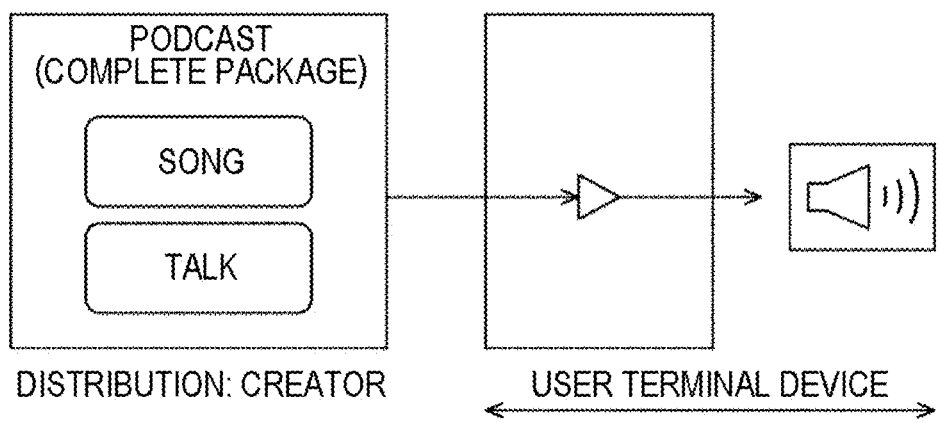
FIG. 4 is a diagram illustrating an example of right processing in a case where distribution including music is performed.

The first is a case where a program including the song is distributed. In this case, as illustrated in FIG. 4, the creator creates a podcast program that is a complete package including a song and talks (foreword and afterword) and the podcast program is distributed, and thus the copyright processing of the song occurs for the creator who distributes the program.

Figure 5:
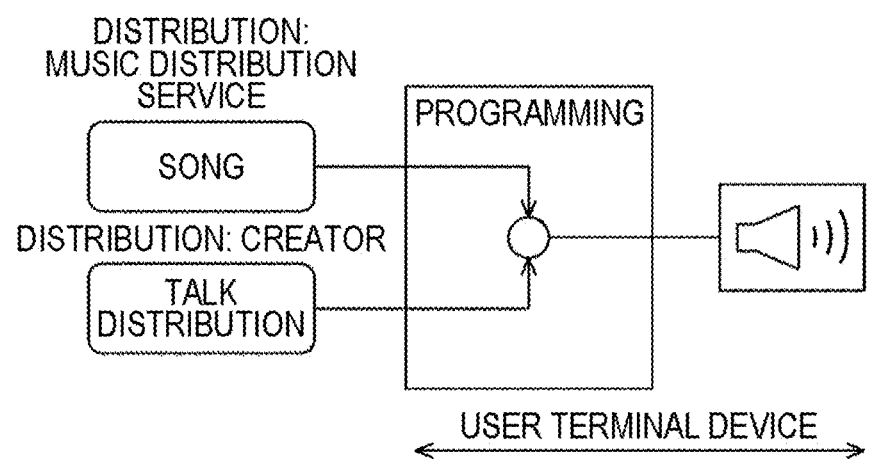
FIG. 5 is a diagram illustrating an example of right processing in a case where VPC type distribution is performed.

The second is a case where a VPC type distribution is performed. In this case, as illustrated in FIG. 5, the song is distributed using the music distribution service, and since the creator only creates and distributes talks (foreword and afterword), the copyright processing of the song does not occur for the creator.

That is, when the creator distributes the podcast program, configuration data, the foreword, and the afterword regarding the configuration of the program are distributed. Thus, since the portion of the song in the program is distributed by the music distribution service, the copyright processing of the song does not occur for the creator.

In the VPC type distribution, since the song to be distributed by streaming by the music distribution service and the talks (foreword and afterword) to be distributed by the creator are synthesized and programmed on the user terminal device used by the user, the right processing of the song portion in the podcast program programmed on the user terminal device side is performed by the user.

As described above, in the VPC type distribution, at the time of distributing the podcast, the creator distributes identification information (song ID) of the song without making a complete podcast program, so that the song streamed by the music distribution service is reproduced on the user terminal device side used by the user on the basis of the song ID.

That is, in the user terminal device, since the song is reproduced using the right that the user has already acquired by a contract with the music distribution service, the copyright processing of the song does not occur to the creator. On the other hand, since the user can also reproduce the song within a normal song distribution range in the music distribution service with which the user has a contract, the user can reproduce the song specified by the song ID an instruction on which is given by the creator without paying an additional fee in particular. In the virtual podcast system, the podcast program is distributed by this Virtual Pod Cast (VPC) type distribution.

Note that the user's contract with the music distribution service is not limited to a pay user subscription (premium user), and even in a free user subscription (free user), in a case where song can be reproduced only by inserting an advertisement, the right can be used.

Figure 6:
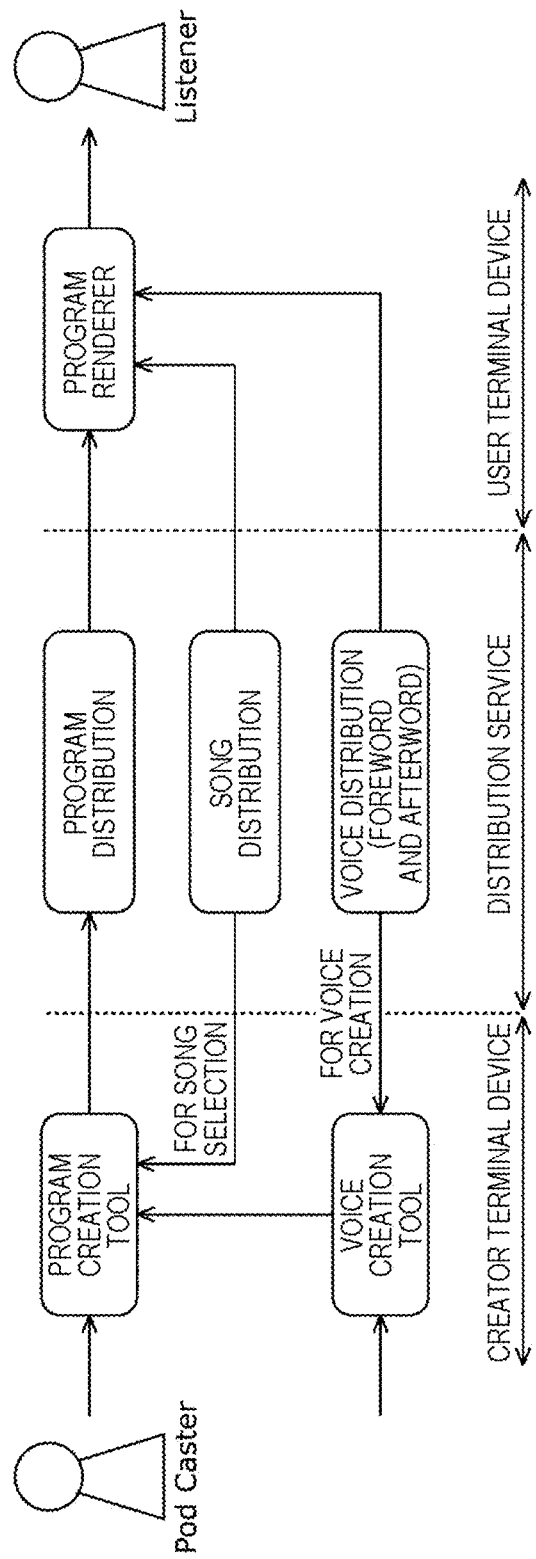
FIG. 6 is a diagram illustrating an example of an overall configuration of the content providing system to which the present technology is applied.

FIG. 6 illustrates an example of an overall configuration of the virtual podcast system.

As illustrated in FIG. 6, functions provided by the virtual podcast system are roughly divided into creator side functions provided by a creator terminal device, various distribution service side functions provided by a distribution server, and user side functions provided by a user terminal device.

In the creator terminal device, a program creation tool and a voice creation tool are executed according to the operation of the creator (PodCaster), and the podcast program is generated.

For example, the program creation tool generates the podcast program on the basis of the song ID of a song selected from a song list (catalog) for song selection provided from a song distribution service, and texts of the foreword and the afterword of the song whose sound at the time of voice synthesis has been adjusted by the voice creation tool, and registers the podcast program in a program distribution service.

The voice creation tool provides a TTS sound adjustment function on the basis of data for voice creation provided from the voice distribution service. By operating the voice creation tool and using the TTS sound adjustment function, the creator can make a TTS voice reproduced on the user side his or her favorite voice.

The program distribution service provides a service for distributing the podcast program registered by the program creation tool to the user terminal device.

The song distribution service corresponds to the music distribution service with which the user who uses the user terminal device has a contract (subscription). The song distribution service distributes the song specified by the song ID set in the podcast program in response to a request from the user terminal device. Furthermore, the song distribution service provides the song list for song selection to the creator terminal device.

The voice distribution service provides a service for distributing, to a user terminal device, a TTS voice obtained by voice synthesis of texts of the foreword and afterword of the song set in the podcast program. Furthermore, the voice distribution service provides data for voice creation to the creator terminal device.

In the user terminal device, a program renderer is executed according to an operation of a user (listener), and the podcast program is reproduced.

When reproducing a desired program from among podcast programs published by the program distribution service, the program renderer performs rendering of a song distributed from the song distribution service and TTS voice distributed from the voice distribution service on the basis of configuration data (reproduction data) related to the configuration of the program.

Thus, the podcast program is reproduced (reproduced) and can be viewed or listened to by the user. Note that the program renderer executed by the user terminal device can also be said to be a reproducing player.

Figure 7:
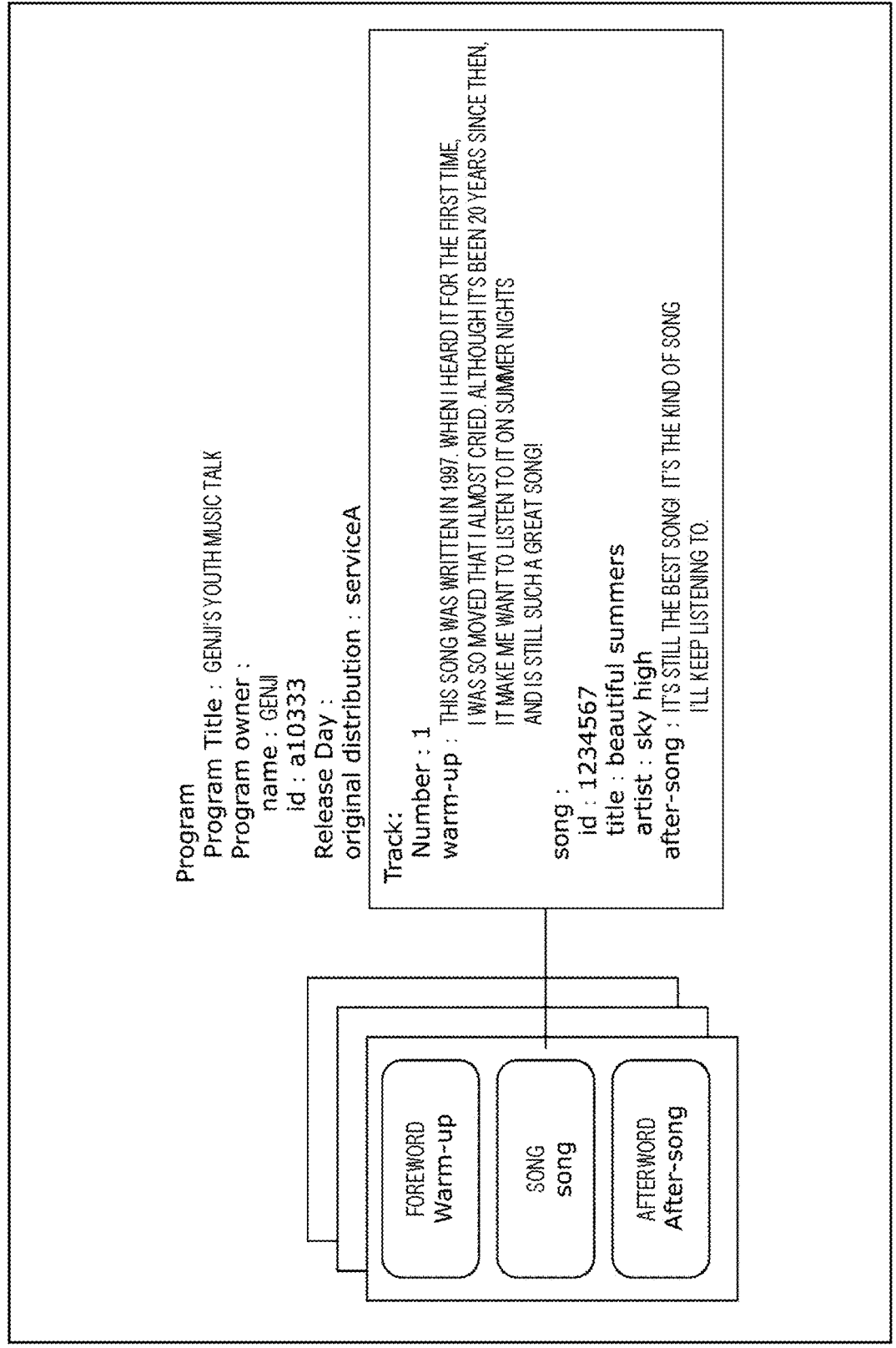
FIG. 7 is a diagram illustrating an example of a script used in the content providing system.

FIG. 7 illustrates an example of a script describing a configuration of the podcast program.

As illustrated in FIG. 7, in the virtual podcast system, a podcast program is configured by setting a plurality of sets of the song ID of a song to be programmed and the foreword and the afterword of the song. This configuration of the podcast program is described by the script illustrated in FIG. 7.

In FIG. 7, in the script, a title and an owner of the program, a release date, a service name serving as a distribution source of the song, and the like are described at the beginning as information regarding the program.

In the script, information regarding the track is described following the information regarding the program. FIG. 7 illustrates an example of description of a first track among the N tracks.

In the track, information regarding the number (Number) of the target track, the foreword (Warm-up), the music (song), and the afterword (After-song) are described.

In the music (song), identification information (id) for identifying the song, information regarding a title (title) and an artist name (artist) of the song, and the like are described. For example, by describing the song ID "1234567", it is possible to request the music distribution service "serviceA" to distribute the song specified by the song ID.

In the foreword (Warm-up) and the afterword (After-song), comment information corresponding to a comment regarding the song is described. For example, as the foreword, the text "This song was written in . . . still such a great song!" is described, and as the afterword, the text "It's still the best song . . . " is described, thereby enabling these texts to be converted into voice and read aloud using the TTS service.

In FIG. 7, only the first track is described, that is, a description example of information related to the song of the first track is illustrated. However, for the second and subsequent songs, similarly to the song of the first track, the song ID, the foreword, and the afterword are described as a set for each song.

In this way, the script including the song ID of the song and the foreword and the afterword related to the song is generated by the creator terminal device used by the creator and registered in the program distribution service, thereby being published to the user.

On the other hand, in the user terminal device used by the user, according to the script published by the program distribution service, control is performed so that the song indicated by the song ID is distributed by streaming using the right that the user has already acquired by the contract with the music distribution service, and control is performed so that the TTS voice of the foreword and the afterword is provided.

In other words, the script merely describes the song ID of the song and the foreword and the afterword in text but does not include the data itself of the song or the voice reproduced in the podcast program, but in the user terminal device, data of the song or the voice is reproduced on the basis of the song ID described in the script and the information indicated by the foreword and the afterword, to thereby reproduce the program created by the creator.

Furthermore, it is possible to program an already existing playlist by generating a script to which the foreword and the afterword are added with respect to (the song ID of) a song in the playlist, and thus the user can easily program the playlist only by inputting the foreword and the afterword of the song.

(Configuration of System)

Figure 8:
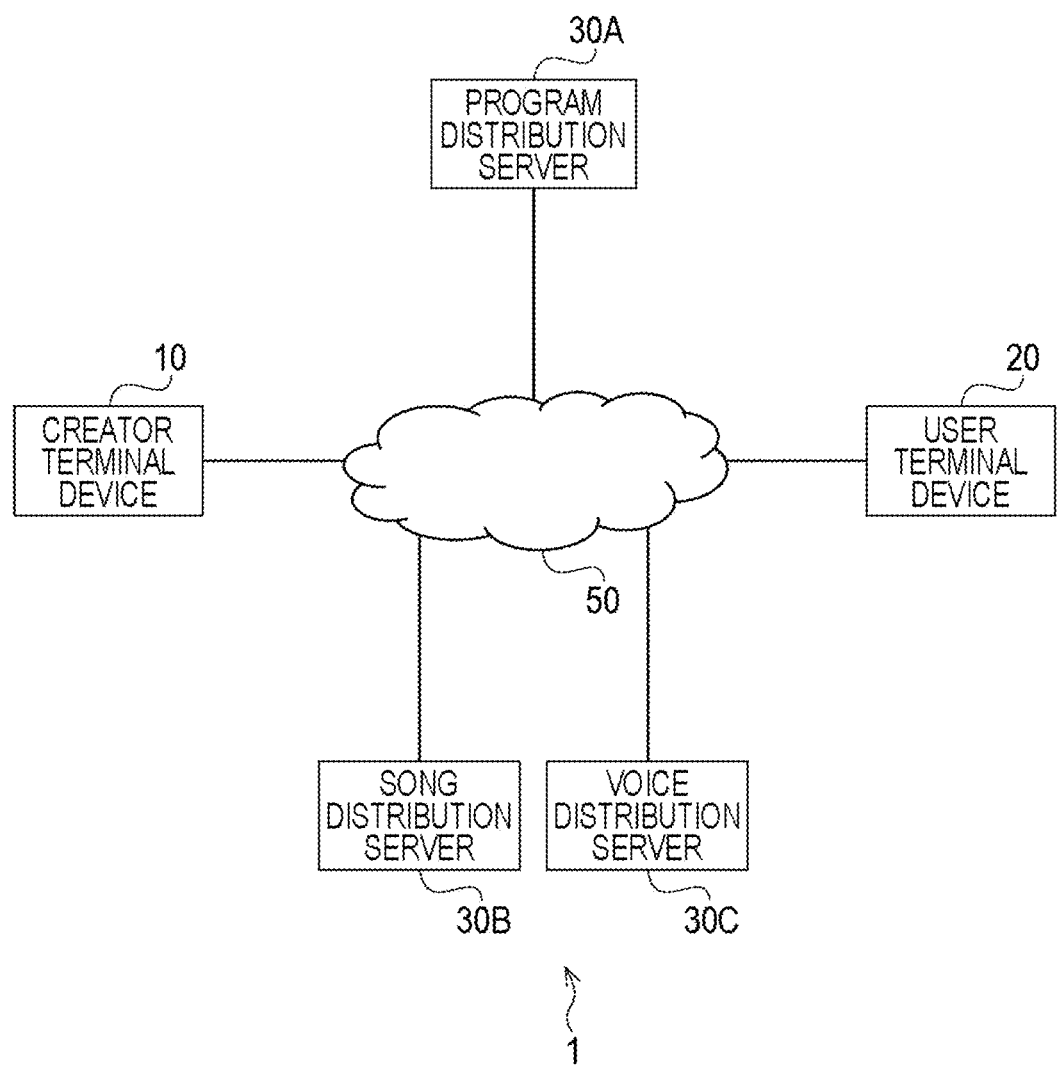
FIG. 8 is a diagram illustrating an example of a configuration of an embodiment of the content providing system to which the present technology is applied.

FIG. 8 illustrates a configuration of the virtual podcast system as an example of a configuration of the embodiment of the content providing system to which the present technology is applied.

In FIG. 8, the content providing system 1 includes a creator terminal device 10, a user terminal device 20, a program distribution server 30A, a song distribution server 30B, and a voice distribution server 30C.

In the content providing system 1, the creator terminal device 10, the user terminal device 20, the program distribution server 30A, the song distribution server 30B, and the voice distribution server 300 are mutually connected via a network 50.

The creator terminal device 10 is a device such as a smartphone, a tablet terminal, or a personal computer, and is used by the creator.

The creator terminal device 10 generates the podcast program script in accordance with the creator's operation, and transmits (uploads) the podcast program script to the program distribution server 30A via the network 50.

The user terminal device 20 is a device such as a smartphone, a tablet terminal, a music player, a game device, or a personal computer, and is used by a user.

The user terminal device 20 accesses the program distribution server 30A via the network 50 according to an operation by the user, and receives (downloads) the script of the podcast program.

The program distribution server 30A includes one or a plurality of servers that provides the program distribution service. The program distribution service is a service for distributing podcast programs, and is provided by a program distributor.

The program distribution server 30A receives the script of the program transmitted (uploaded) from the creator terminal device 10 via the network 50, and registers the script in the storage medium to be browsable by the user using the user terminal device 20.

In a case where the program distribution server 30A receives a reproduction request for the program transmitted from the user terminal device 20 via the network 50, the program distribution server 30A reads the script of the program from the storage medium and distributes the script to the user terminal device 20 that is the reproduction request source.

The song distribution server 30B includes one or a plurality of servers that provides the music distribution service. The music distribution service is a service that distributes songs through the Internet and is provided by a music distributor. For example, the music distribution service is provided in an unlimited-listening format of a flat-rate streaming.

In a case where a distribution request for a song transmitted from the user terminal device 20 via the network 50 is received, the song distribution server 30B specifies the song corresponding to the received distribution request and distributes streaming data of the song to the user terminal device 20 that is the distribution request source.

The voice distribution server 30C includes one or a plurality of servers that provides the voice distribution service. The voice distribution service is a service for distributing voice such as TTS voice or raw voice through the Internet, and is provided by a voice distributor.

In a case where the voice distribution server 30C receives the distribution request of the voice transmitted from the user terminal device 20 via the network 50, the voice distribution server 30C acquires the voice corresponding to the received distribution request, and distributes data of the voice to the user terminal device 20 as the distribution request source.

Note that, in the following description, the program distribution server 30A, the song distribution server 30B, and the voice distribution server 30C will be referred to as the distribution server 30 in a case where it is not particularly necessary to distinguish them. Furthermore, the program distributor, the music distributor, and the voice distributor may be the same business or different businesses.

The network 50 includes a communication network such as the Internet, an intranet, or a mobile phone network, and enables interconnection between devices using a communication protocol such as Transmission Control Protocol/Internet Protocol (TCP/IP).

(Configuration of User Terminal Device)

Figure 9:
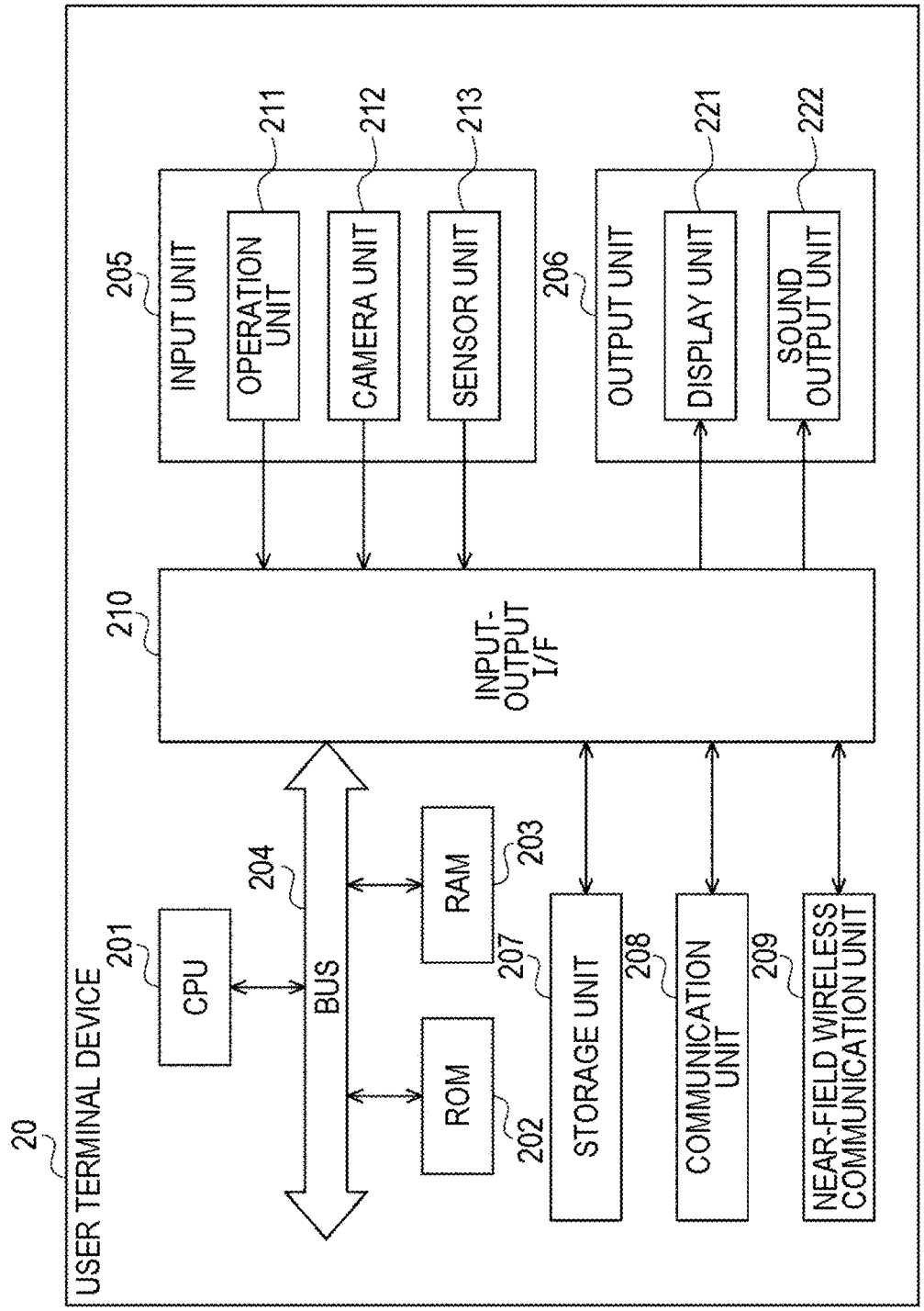
FIG. 9 is a diagram illustrating an example of a configuration of a user terminal device.

FIG. 9 illustrates an example of a configuration of the user terminal device 20 of FIG. 8.

As illustrated in FIG. 9, in the user terminal device 20, a central processing unit (CPU) 201, a read only memory (ROM) 202, and a random access memory (RAM) 203 are mutually connected by a bus 204.

The CPU 201 controls the operation of each unit of the user terminal device 20 by executing a program recorded in the ROM 202 or the storage unit 207. Various data are appropriately stored in the RAM 203.

An input-output I/F 210 is also connected to the bus 204. An input unit 205, an output unit 206, a storage unit 207, a communication unit 208, and a near-field wireless communication unit 209 are connected to the input-output I/F 210.

The input unit 205 supplies various input data to each unit including the CPU 201 via the input-output I/F 210. For example, the input unit 205 includes an operation unit 211, a camera unit 212, and a sensor unit 213.

The operation unit 211 is operated by the user and supplies operation data corresponding to the operation to the CPU 201. The operation unit 211 includes a physical button, a touch panel, and the like.

The camera unit 212 photoelectrically converts light from a subject incident thereon, and performs signal processing on an electric signal obtained as a result, thereby generating and outputting captured image data. The camera unit 212 includes an image sensor, a signal processing unit, and the like.

The sensor unit 213 performs sensing of space information, time information, and the like, and outputs sensor data obtained as a result of the sensing.

The sensor unit 213 includes an acceleration sensor, a gyro sensor, and the like. The acceleration sensor measures accelerations in three directions of XYZ axes. The gyro sensor measures angular velocities of three axes of the XYZ axes. Note that an inertial measurement unit (IMU) may be provided to measure three-dimensional acceleration and angular velocity with an accelerometer in three directions and a gyroscope with three axes.

Furthermore, the sensor unit 213 can include various sensors such as a sound sensor (microphone) that detects a sound such as a user's voice, a biological sensor that measures information such as a heart rate, a body temperature, or a posture of a living thing, a proximity sensor that measures a nearby object, and a magnetic sensor that measures a magnitude and a direction of a magnetic field (magnetic field).

The output unit 206 outputs various types of information under the control of the CPU 201 via the input-output I/F 210. For example, the output unit 206 includes a display unit 221 and a sound output unit 222.

The display unit 221 displays an image or the like corresponding to the image data under the control of the CPU 201. The display unit 221 includes a panel unit such as a liquid crystal panel or an organic light emitting diode (OLED) panel, a signal processing unit, and the like.

The sound output unit 222 outputs a sound corresponding to the sound data under the control of the CPU 201. The sound output unit 222 includes a speaker, a headphone connected to an output terminal, and the like.

The storage unit 207 records various data and programs under the control of the CPU 201. The CPU 201 reads and processes various data from the storage unit 207, and executes a program.

The storage unit 207 is configured as an auxiliary storage device such as a semiconductor memory. The storage unit 207 may be configured as an internal storage or may be an external storage such as a memory card.

The communication unit 208 communicates with other devices via the network 50 under the control of the CPU 201. The communication unit 208 is configured as a communication module compatible with cellular communication (for example, LTE-Advanced, 5G, or the like), wireless communication such as a wireless local area network (LAN), or wired communication.

The near-field wireless communication unit 209 performs wireless communication according to a near-field wireless communication standard such as Bluetooth (registered trademark) or near field communication (NFC), and exchanges various data.

Note that the configuration of the user terminal device 20 illustrated in FIG. 9 is an example, and for example, a microphone may be provided as an input unit, an image processing circuit such as a graphics processing unit (GPU), a power supply circuit, or the like may be provided.

Figure 10:
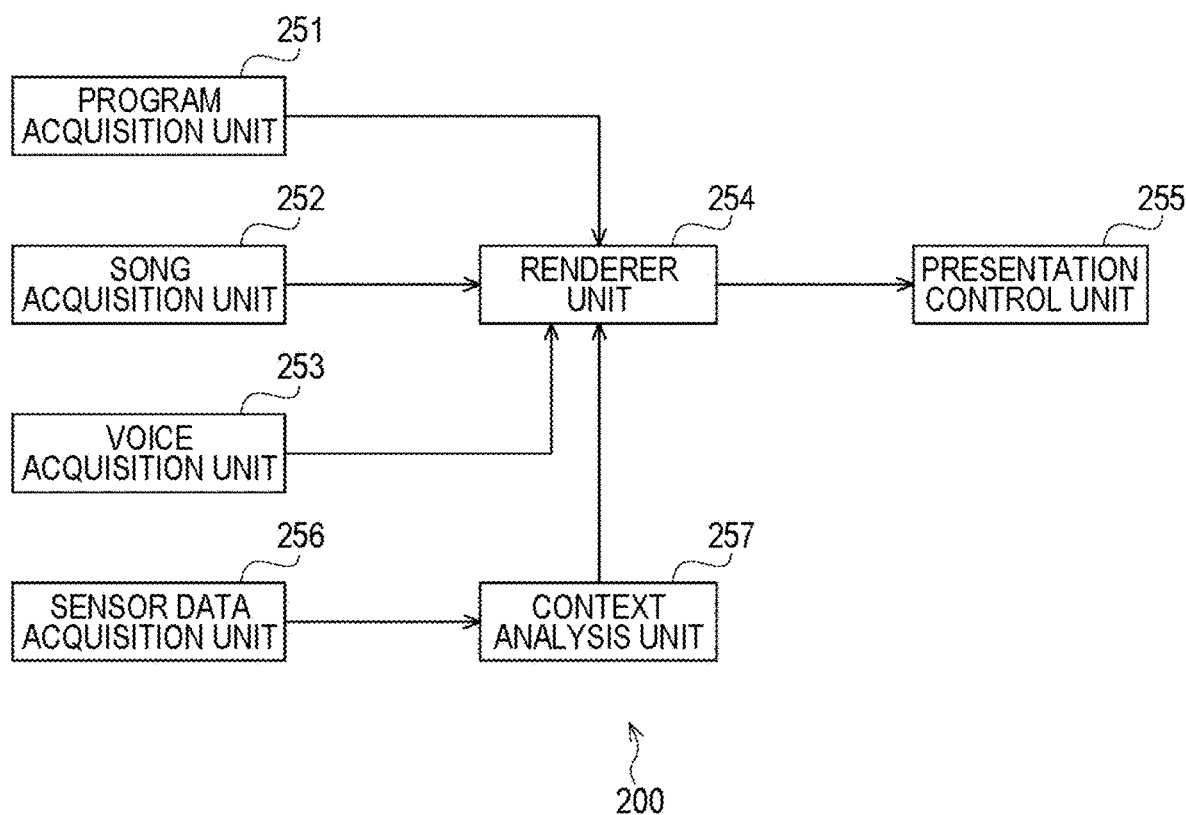
FIG. 10 is a diagram illustrating an example of a functional configuration of a control unit in the user terminal device.

FIG. 10 illustrates an example of a functional configuration of the control unit 200 in the user terminal device 20. The function of the control unit 200 is achieved by the CPU 201 executing a program such as a program renderer.

In FIG. 10, the control unit 200 includes a program acquisition unit 251, a song acquisition unit 252, a voice acquisition unit 253, a renderer unit 254, a presentation control unit 255, a sensor data acquisition unit 256, and a context analysis unit 257.

The program acquisition unit 251 acquires the script of the podcast program according to an operation by the user supplied from the communication unit 208 that communicates with the program distribution server 30A, and supplies the script to the renderer unit 254.

The song acquisition unit 252 acquires streaming data of the song corresponding to the song ID supplied from the communication unit 208 that communicates with the song distribution server 30B, and supplies the streaming data to the renderer unit 254.

The voice acquisition unit 253 acquires voice data corresponding to the foreword and the afterword supplied from the communication unit 208 that communicates with the voice distribution server 30C, and supplies the voice data to the renderer unit 254.

On the basis of the script of the program supplied from the program acquisition unit 251, the renderer unit 254 performs rendering processing on the voice data of the foreword supplied from the voice acquisition unit 253, the streaming data of the song supplied from the song acquisition unit 252, and the voice data of the afterword supplied from the voice acquisition unit 253, and supplies resulting data to the presentation control unit 255.

The presentation control unit 255 supplies the data supplied from the renderer unit 254 to the output unit 206 to thereby present the program to the user.

For example, by supplying the voice data of the foreword, the streaming data of the song, and the voice data of the afterword to the sound output unit 222, the presentation control unit 255 can output and present voice of the foreword and the afterword set in the program before and after the song together with the sound of a programmed song.

The sensor data acquisition unit 256 acquires sensor data supplied from the sensor unit 213 and supplies the sensor data to the context analysis unit 257.

The context analysis unit 257 analyzes the context of the user on the basis of the sensor data supplied from the sensor data acquisition unit 256, and supplies the analysis result to the renderer unit 254. The renderer unit 254 performs a reproduction control process according to the user context on the basis of the analysis result from the context analysis unit 257.

(Configuration of Distribution Server)

Figure 11:
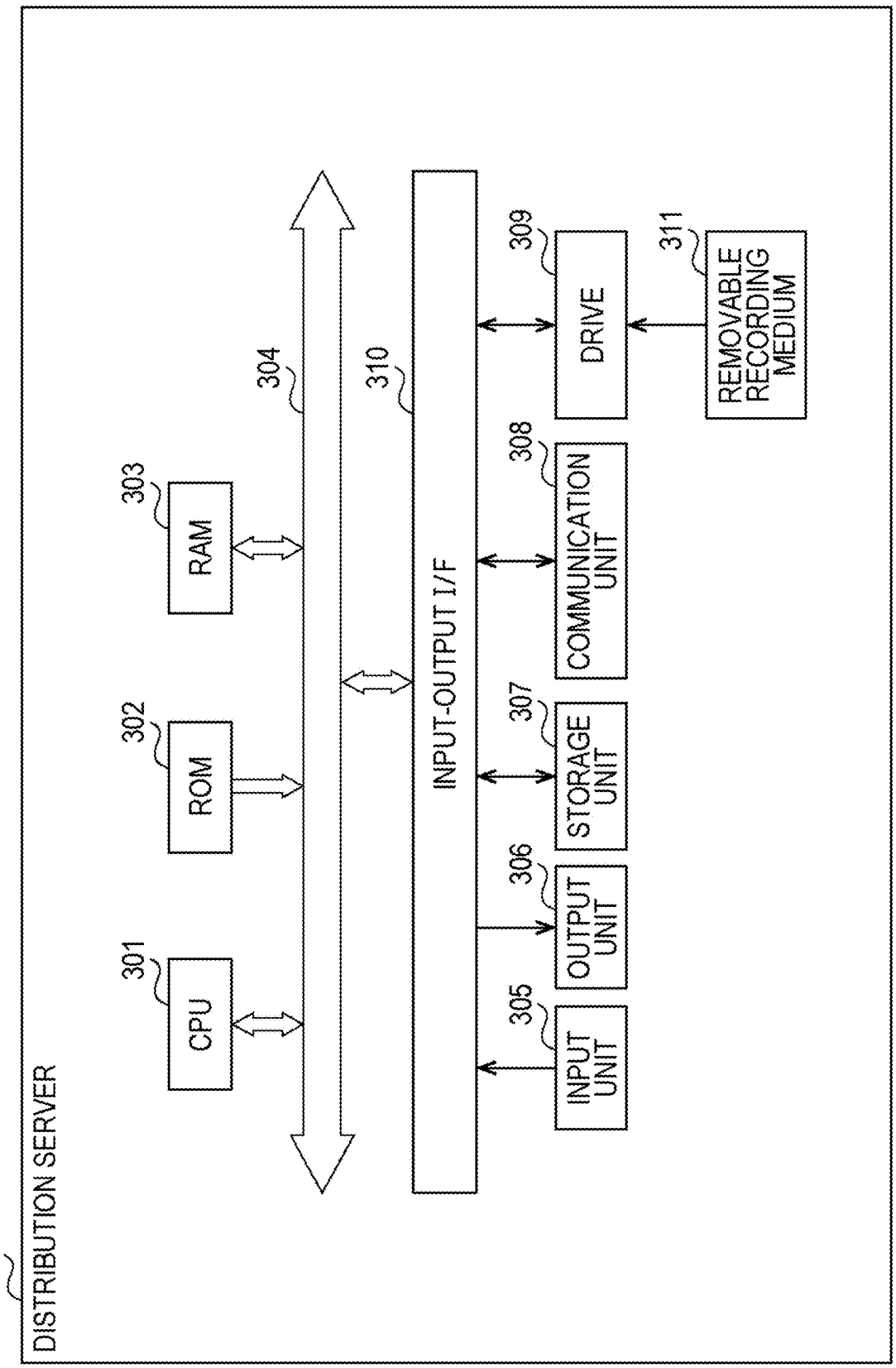
FIG. 11 is a diagram illustrating an example of a configuration of a distribution server.

FIG. 11 illustrates an example of a configuration of the distribution server 30 of FIG. 8. Note that the distribution server 30 corresponds to any server of the program distribution server 30A, the song distribution server 30B, and the voice distribution server 30C illustrated in FIG. 8.

In the distribution server 30, a CPU 301, a ROM 302, and a RAM 303 are mutually connected by a bus 304. An input-output I/F 310 is further connected to the bus 304. An input unit 305, an output unit 306, a storage unit 307, a communication unit 308, and a drive 309 are connected to the input-output I/F 310.

The input unit 305 includes a microphone, a keyboard, a mouse, and the like. The output unit 306 includes a speaker, a display, and the like.

The storage unit 307 includes a hard disk drive (HDD), a semiconductor memory, and the like. The communication unit 308 is configured as a communication module compatible with wireless communication such as a wireless LAN or wired communication such as Ethernet (registered trademark).

The drive 309 drives a removable recording medium 311 such as a magnetic disk, an optical disk, a magneto-optical disk, or a semiconductor memory.

Figure 12:
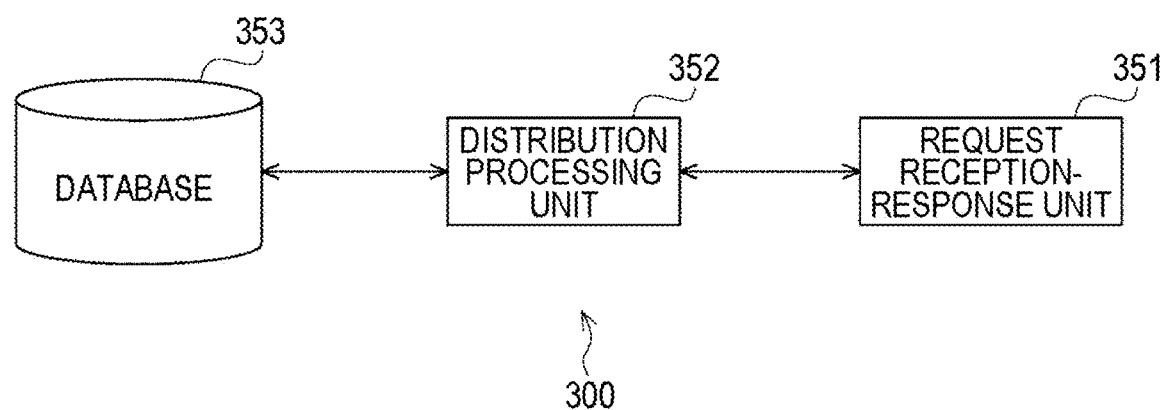
FIG. 12 is a diagram illustrating an example of a functional configuration of a control unit in the distribution server.

FIG. 12 illustrates an example of a functional configuration of the control unit 300 in the distribution server 30. The function of the control unit 300 is implemented by the CPU 301 executing a program of each service.

In FIG. 12, the control unit 300 includes a request reception-response unit 351, a distribution processing unit 352, and a database 353.

The request reception-response unit 351 receives various requests supplied from the communication unit 308 that communicates with the creator terminal device 10 or the user terminal device 20, and supplies the requests to the distribution processing unit 352.

The distribution processing unit 352 performs distribution processing according to various requests supplied from the request reception-response unit 351.

The database 353 is recorded in the storage unit 307 including a large-capacity storage such as an HDD or a semiconductor memory.

For example, the script of the podcast program or the like is stored in the database 353 of the program distribution server 30A. Furthermore, in the database 353 of the song distribution server 30B, a song provided by the music distribution service is stored in association with the song ID. Moreover, the database 353 of the voice distribution server 30C stores information regarding the voice at the time of voice synthesis or voice creation, voice data of the foreword or the afterword, and the like.

When performing the distribution processing, the distribution processing unit 352 processes various data stored in the database 353, generates responses according to various requests, and supplies the responses to the request reception-response unit 351.

The request reception-response unit 351 controls the communication unit 308 to transmit a response according to various requests supplied from the distribution processing unit 352 to the creator terminal device 10 or the user terminal device 20 as a request source via the network 50.

Next, a flow of processing executed in each device of the content providing system 1 will be described.

(Overall Processing Flow)

Figure 13:
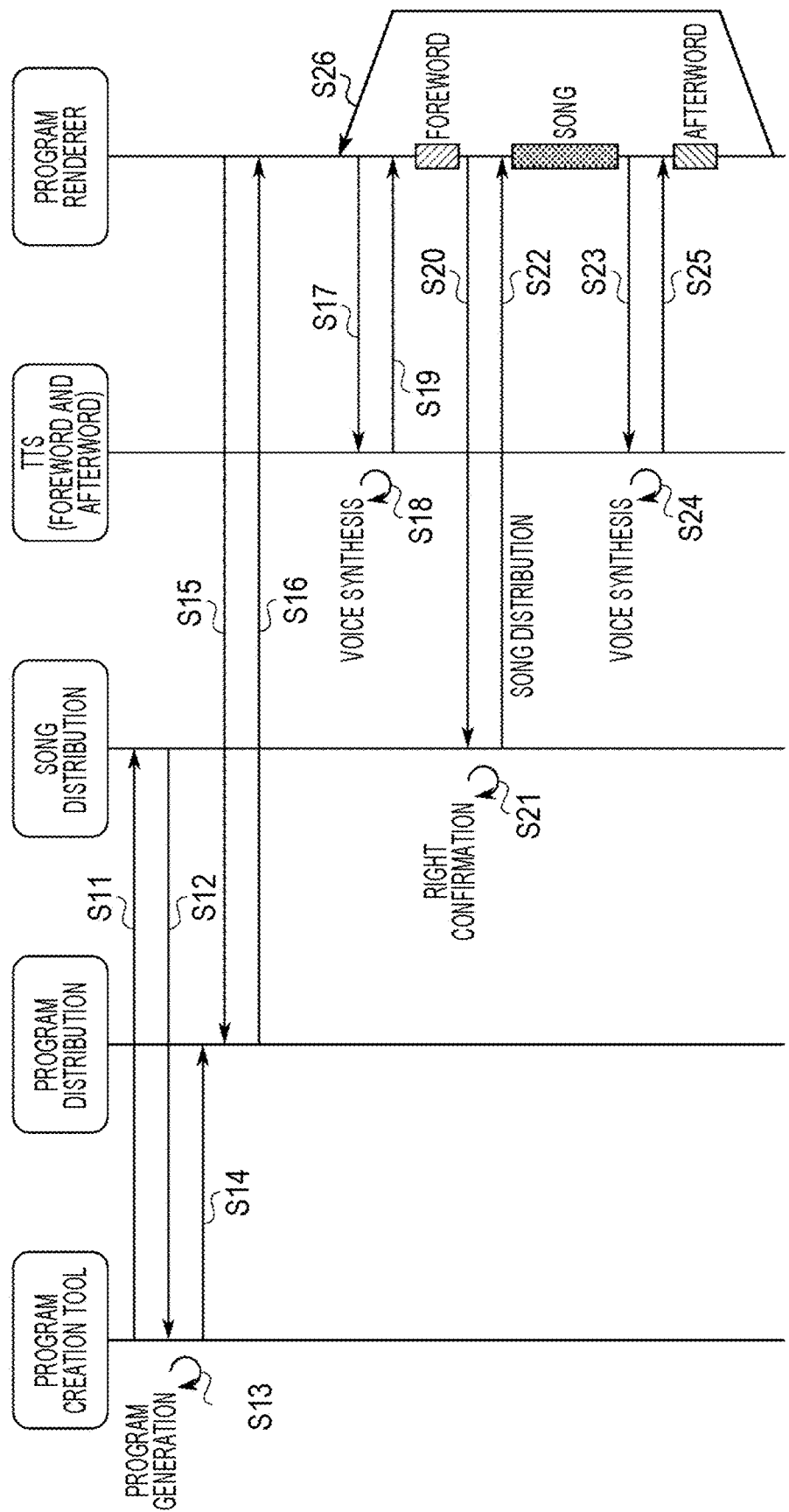
FIG. 13 is a sequence diagram illustrating an overall processing flow of the content providing system.

FIG. 13 is a sequence diagram illustrating an overall processing flow of the content providing system 1.

In FIG. 13, the program creation tool is executed by the creator terminal device 10, and the program renderer is executed by the user terminal device 20. Furthermore, in FIG. 13, the program distribution service is provided by the program distribution server 30A, the music distribution service is provided by the song distribution server 30B, and the TTS service is provided by the voice distribution server 30C.

In the creator terminal device 10, a program creation tool is executed by the control unit 100, and the processing of steps S11 to S14 is executed.

The program creation tool requests the song distribution server 30B for the song list, thereby acquiring the song list transmitted from the song distribution server 30B and presenting the song list to the creator (S11 and S12).

The program creation tool generates the script of the podcast program on the basis of the song ID of the song selected from the song list by the creator and the texts of the foreword and the afterword of the song input by the creator (S13), and registers the script in the program distribution server 30A (S14).

Thus, in the program distribution server 30A, the script of the podcast program created by the creator is stored in the database 353, and can be browsed by the user using the user terminal device 20.

In the user terminal device 20, the program renderer is executed by the control unit 200, and the program renderer operates in cooperation with each distribution server 30, so that the processing of steps S15 to S26 is executed.

In the program renderer, in a case where an instruction to reproduce a podcast program published to be browsable on the program distribution server 30A is given by the user's operation, the script of the program distributed from the program distribution server 30A is received (S15 and S16).

The program renderer requests the voice distribution server 30C to synthesize the voice of the text of the foreword on the basis of the foreword set to the beginning of the received script (S17).

In the voice distribution server 30C, voice synthesis of the text of the foreword is performed in response to the request from the program renderer (S18), and a result of the voice synthesis is distributed (S19).

Thus, in the program renderer, a result of the voice synthesis distributed from the voice distribution server 30C is received, and the rendering processing is performed, so that the TTS voice of the foreword portion set in the programmed song is reproduced.

Next, on the basis of the song ID set next to the foreword of the received script, the program renderer requests the song distribution server 30B that provides the music distribution service contracted by the user to distribute the song specified by the song ID (S20).

In the song distribution server 30B, in response to the request from the program renderer, the right acquired by the contract with the music distribution service by the user is confirmed (S21), and in a case where it is determined that the user has a legitimate right and reproduction of the song specified by the song ID is possible, streaming distribution of the song is performed (S22).

Thus, in the program renderer, the streaming data of the song distributed from the song distribution server 30B is received and the rendering processing is performed, so that the song specified by the song ID is reproduced as the programmed song.

Thereafter, when the reproduction of the song that is distributed by streaming is completed, the program renderer requests the voice distribution server 30C to perform voice synthesis of the text of the afterword on the basis of the afterword set next to the song ID of the received script (S23).

In the voice distribution server 30C, the voice synthesis of the text of the afterword is performed in response to the request from the program renderer (S24), and a result of the voice synthesis is distributed (S25).

Thus, in the program renderer, the result of the voice synthesis distributed from the voice distribution server 30C is received and the rendering processing is performed, so that the TTS voice of the afterword set in the programmed song is reproduced.

Furthermore, in the script of the podcast program, since the song ID of each of a plurality of songs is programmed together with the texts of the foreword and the afterword of the song, after the processing of steps S17 to S25 is completed, the processing returns to the processing of step S17 (S26), and the processing of steps S17 to S26 is repeated according to the number of song IDs.

Thus, in the program renderer, reproduction is repeatedly performed in the order of the foreword, the song, and the afterword for each song ID set in the script of the program, and the podcast program can be viewed or listened to by the user.

The flow of reception processing has been described above.

(Flow of Reproduction Control According to Context)

Figure 14:
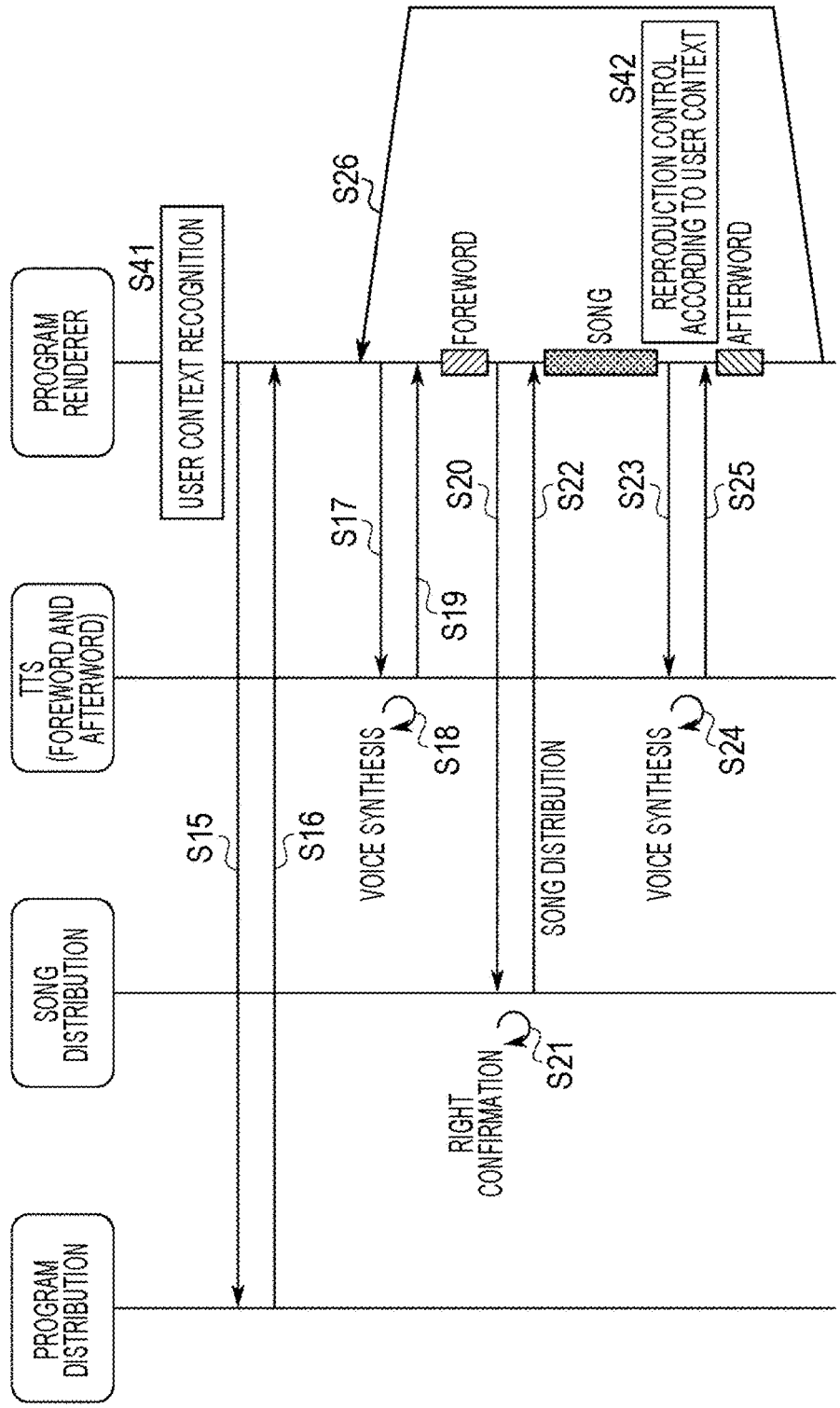
FIG. 14 is a sequence diagram illustrating a flow of processing in a case where reproduction control according to a context of a user is performed.

FIG. 14 is a sequence diagram illustrating a flow of processing in a case where reproduction control according to the context of the user is performed.

In FIG. 14, in the program renderer, the context of the user is recognized prior to the reproduction of the podcast program (S41). The user context is obtained by analyzing the sensor data by the context analysis unit 257.

FIG. 15 illustrates an example of the user context.

As illustrated in FIG. 15, states such as "stationary", "temporarily stopped", "walking", "running", "jumping", "sitting", "standing", "ascending in an elevator", "descending in an elevator", and "riding on a train" as the type of action of the user can be specified by analyzing sensor data from the acceleration sensor.

Furthermore, states such as "turning right" and "turning left" as the type of behavior of the user can be specified by analyzing sensor data from the acceleration sensor and the gyro sensor.

Furthermore, in FIG. 15, "stationary" and "temporarily stopped", which are states in which the exclusive relationship is both represented by A, have an exclusive relationship. That is, these actions cannot occur simultaneously. Furthermore, in "walking", "running", and "jumping", which are states in which the exclusive relationship is both represented by B, actions do not occur at the same time.

Moreover, in "sitting" and "standing" which are states in which the exclusive relationship is both represented by C, actions do not occur at the same time. In "ascending in an elevator", "descending in an elevator", and "riding on a train", which are states in which the exclusive relationship is both represented by D, actions do not occur at the same time. In "turning right" and "turning left" in which the exclusive relationship is both represented by E, actions do not occur at the same time.

Furthermore, as a method of detecting the user context, for example, whether or not the user is at work may be detected using a scheduler, a degree of concentration of the user may be detected using sensor data obtained from a biometric sensor, an expression of the face may be detected by analyzing image data including the face of the user, a season, a temperature, weather, or the like may be detected using sensor data obtained from an environmental sensor, or an action of the user may be recognized using sensor data obtained from a vibration sensor.

Returning to the description of FIG. 14, in the program renderer, in a case where an instruction on reproduction of a podcast program published to be browsable on the program distribution server 30A is given by the user's operation, the program is reproduced (S15 to S26), but here, reproduction control according to the user context is performed (S42).

That is, the program renderer accesses the song distribution server 60B and the voice distribution server 60C on the basis of the program script, and uses the recognized user context to perform more appropriate reproduction for the user when repeating the reproduction in the order of the foreword, the song, and the afterword for each song specified by the song ID.

For example, more appropriate reproduction control is performed on the basis of the user context so as not to disturb the user who is concentrating on work or listening to music.

(Overall Image of Processing)

Figure 16:
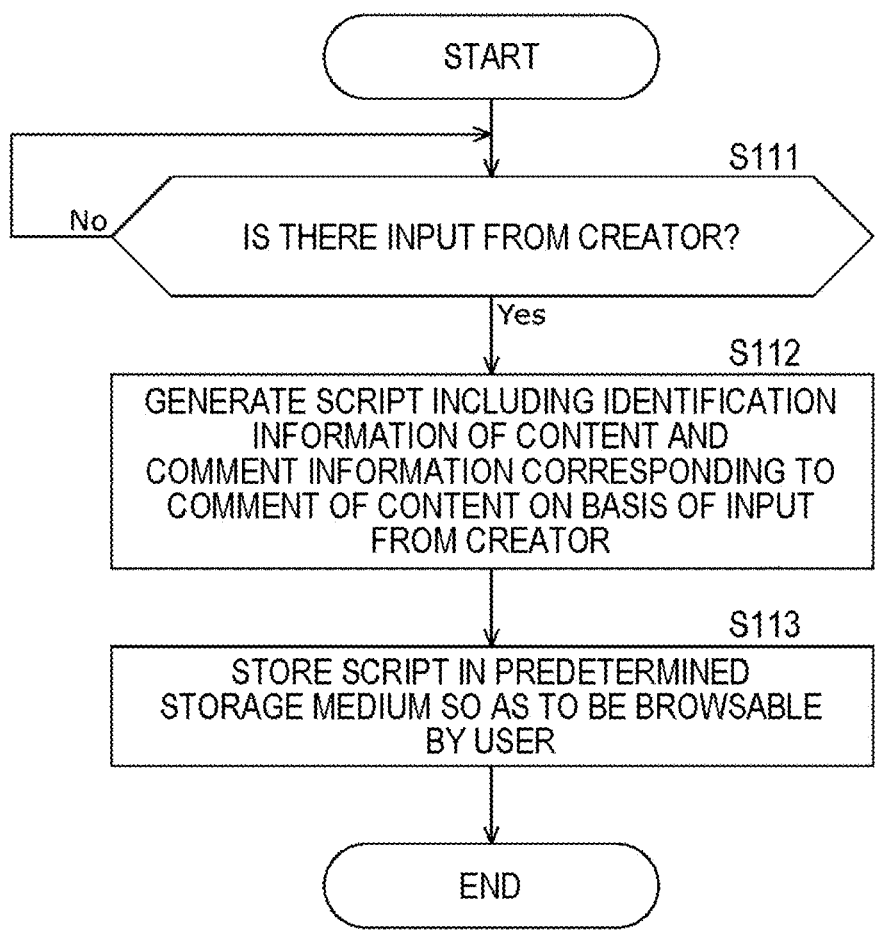
FIG. 16 is a flowchart illustrating an overall image of processing in a first embodiment.
Figure 17:
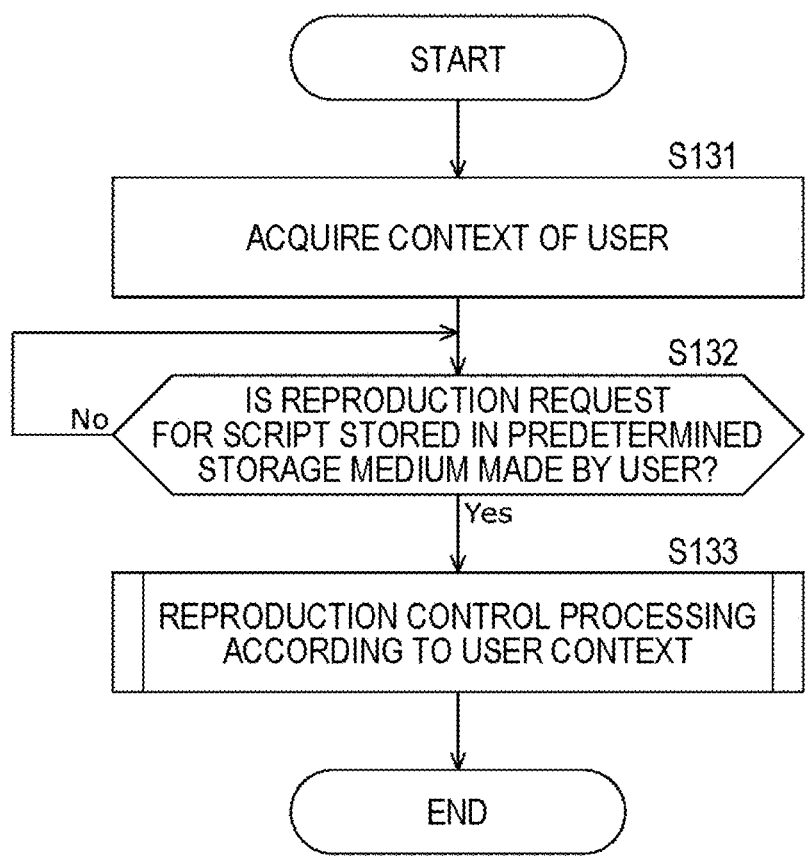
FIG. 17 is a flowchart illustrating an overall image of processing in the first embodiment.
Figure 18:
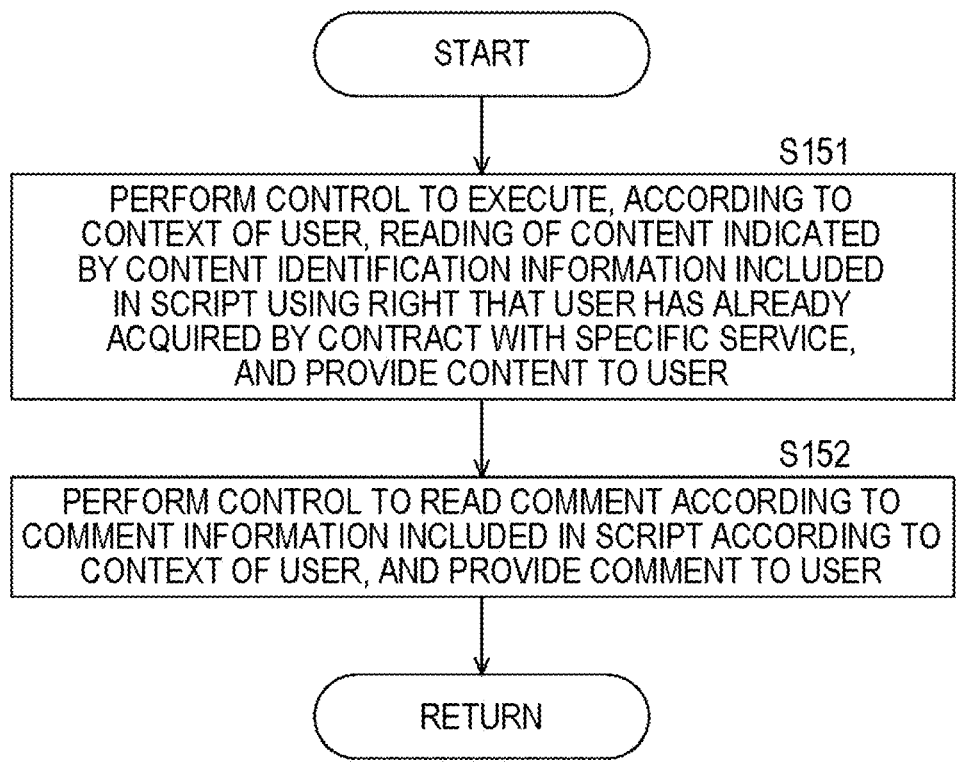
FIG. 18 is a flowchart illustrating an overall image of processing in the first embodiment.

FIGS. 16 to 18 are flowcharts describing an overall image of processing in the first embodiment.

The processing illustrated in FIGS. 16 to 18 is implemented by (the control unit 100 of) the creator terminal device 10, (the control unit 200 of) the user terminal device 20, and (the control unit 300 of) the distribution server 30 in the content providing system to which the present technology is applied operating in cooperation.

That is, this processing is executed by at least one of the control unit 100, the control unit 200, or the control unit 300.

In the content providing system 1, as illustrated in FIG. 16, in a case where there is an input from the creator who uses the creator terminal device 10 ("Yes" in S111), a script including identification information of content and comment information corresponding to the comment of the content is generated on the basis of the input (S112), and the script is stored in a predetermined storage medium to be browsable by the user who uses the user terminal device 20 (S113).

Here, the content includes a song and the like distributed by the music distribution service, and the identification information of the content includes a song ID or the like that can identify the song. Furthermore, the comment is, for example, a foreword and an afterword set in the song, and at least one of the foreword or the afterword may be set. For example, in programming the song, in addition to inserting the foreword or the afterword in units of songs, a narration or the like may be inserted as the foreword and then three songs may be continuously reproduced, or an impression or the like of the song may be inserted as the afterword after four songs are reproduced continuously.

The comment information includes text indicating a comment, link information to a raw voice of a creator or the like, or the like. Note that the description will be given assuming that the comment information corresponds to the comment related to the content, but the comment information is not necessarily related to the content, and may correspond to a comment not related to the content. The predetermined storage medium can be, for example, (the database 353 of) the storage unit 307 of the program distribution server 30A.

Furthermore, in the content providing system 1, as illustrated in FIG. 17, the context of the user is acquired (S131), and in a case where a reproduction request for a script stored in a predetermined storage medium is made by the user ("Yes" in S132), a reproduction control process according to the user context is performed (S133).

In the reproduction control process according to the user context, as illustrated in FIG. 18, control is performed to execute, according to the context of the user, reading of the content indicated by the content identification information included in the script using the right that the user has already acquired by the contract with the specific service, and provide the content to the user (S151).

Here, the content identification information includes the song ID or the like that can identify a song. Furthermore, for example, the specific service is a music distribution service, and rights that the user has already acquired include rights of a pay premium user, a free user, and the like.

Furthermore, in the reproduction control process according to the user context, as illustrated in FIG. 18, control is performed to read the comment according to the comment information included in the script according to the context of the user, and provide the comment to the user (S152).

Here, the comment includes at least one of the foreword or the afterword, and the foreword and the afterword read according to the comment information of the script include speech such as TTS voice or raw voice.

As described above, when the content is programmed, the content and the comment can be more appropriately provided by providing the content and the comment regarding the content or the like using the context of the user.

2. Second Embodiment

As a method of controlling reproduction according to the user context, there is a method of skipping a voice when the user is listening to a program while performing other operation such as work, or a method of prohibiting insertion of an advertisement when the user is concentrating on a song. Such control is performed not only to prevent disturbing the user who is concentrating on the song, but also to reduce the effect of inserting an advertisement when the user is concentrating on the song.

(Flow of Reproduction Control Corresponding to Listening while Doing Something)

Figure 19:
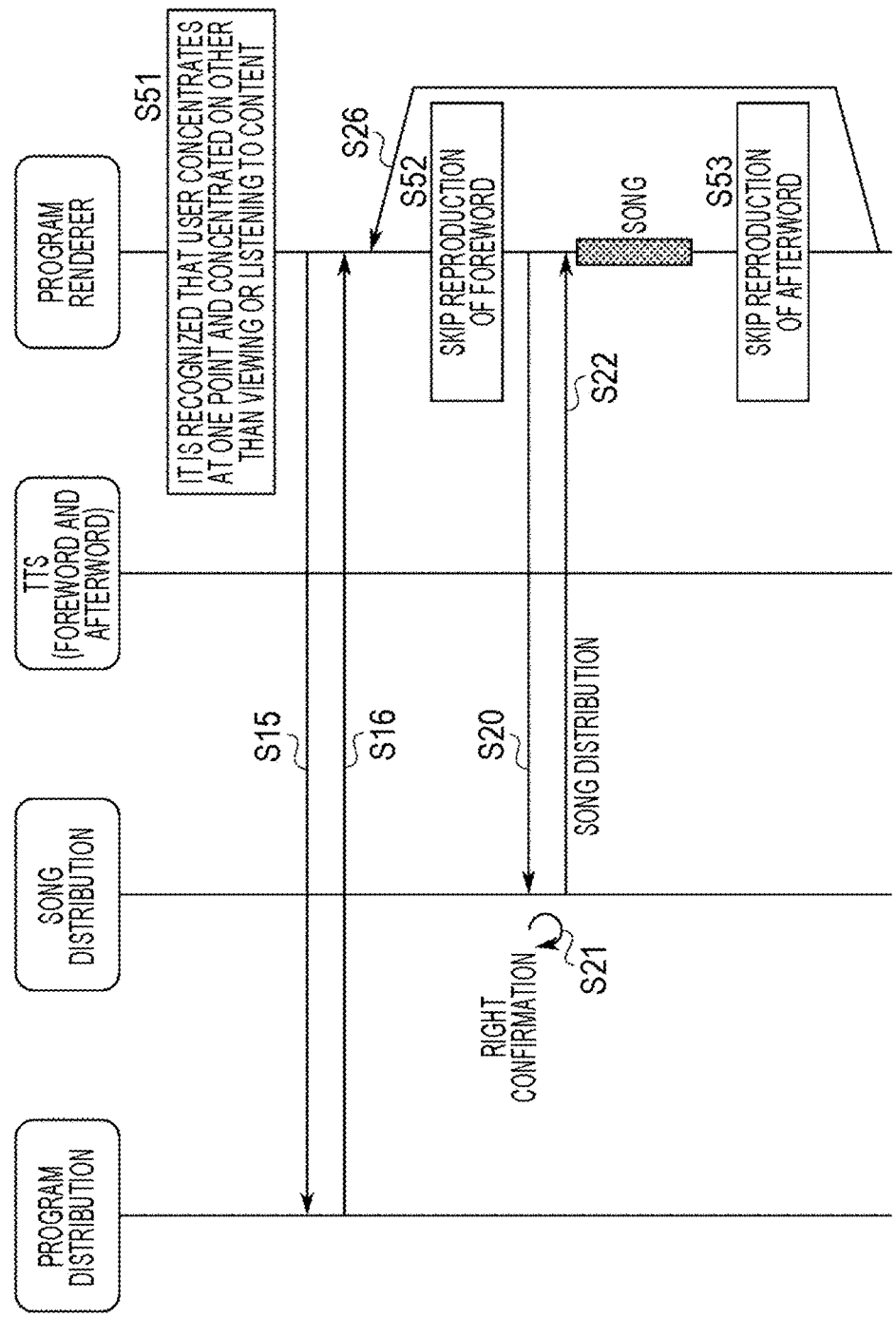
FIG. 19 is a sequence diagram illustrating a flow of processing in a case where a voice is skipped when the user is listening to a program while performing other operation such as work.

FIG. 19 is a sequence diagram illustrating a flow of processing in a case where a voice is skipped when a user is listening to a program while performing other operation such as work.

In FIG. 19, in the program renderer, prior to the reproduction of the podcast program, the user context indicating that the user concentrates on one point and concentrates on other than the viewing or listening to the content (song) is recognized on the basis of the analysis result from the context analysis unit 257 (S51).

For example, as the sensing method of the degree of concentration, the degree of concentration of the user can be estimated by using the respiration, the heartbeat, the brain waves, the variation of the skin potential, and the like of the user on the basis of the sensor data from the sensor unit 213.

In the program renderer, in a case where an instruction to reproduce a podcast program published to be browsable on the program distribution server 30A is given by the user's operation, the program is reproduced (S15 to S26), but here, reproduction control according to the user context is performed (S52 and S53).

In other words, since the program renderer recognizes that the user concentrates on one point and concentrates on other than the listening to the song as the user context, when the foreword, the song, and the afterword are repeatedly reproduced in this order for each song specified by the song ID on the basis of the script of the program to be reproduced, reproduction of the foreword and the afterword are skipped (S52 and S53), and only the song is reproduced.

As described above, in a case where the user listens to the program while concentrating on other operation such as work, there is a possibility that the concentration of the user is disturbed by the foreword or the afterword, and thus reproduction of the foreword or the afterword is skipped to perform more appropriate reproduction control.

Note that, in the above description, although the control for skipping the reproduction of the foreword and the afterword has been described, for example, the volume of a program (in particular, the voice of the foreword and the afterword) may be reduced, or the noise of the environmental sound may be canceled. In short, it is sufficient that the reproduction of the program is controlled so as not to disturb the user who is concentrating on other operation such as work, and the control method is arbitrary.

Other Configurations of System

Figure 20:
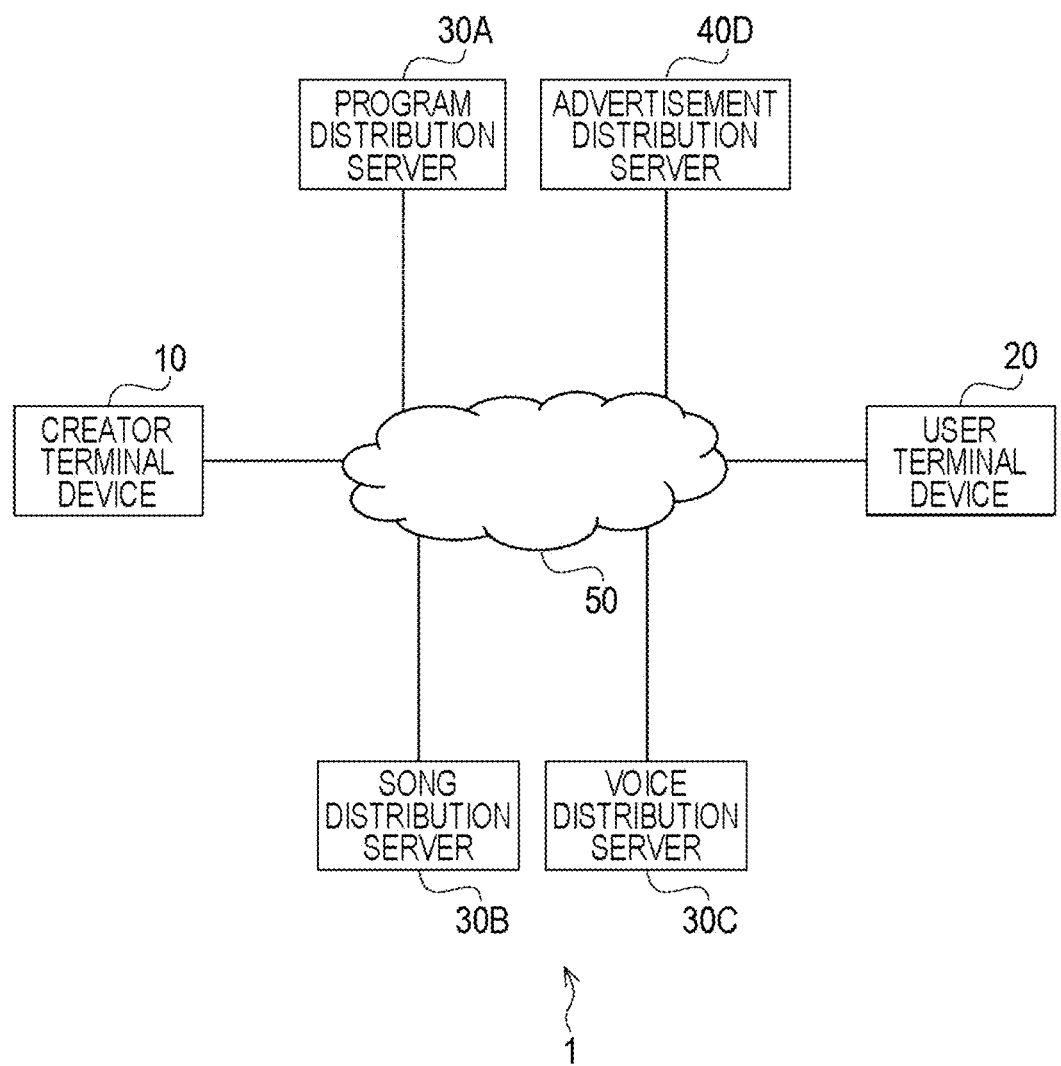
FIG. 20 is a diagram illustrating an example of another configuration of the embodiment of the content providing system to which the present technology is applied.

FIG. 20 illustrates an example of another configuration of an embodiment of the content providing system to which the present technology is applied.

In FIG. 20, similarly to FIG. 8, the content providing system 1 includes the creator terminal device 10, the user terminal device 20, the program distribution server 30A, the song distribution server 30B, and the voice distribution server 30C, but the advertisement distribution server 30D is further provided.

The advertisement distribution server 30D includes one or a plurality of servers that provides advertisement distribution services. The advertisement distribution service is a service that distributes an advertisement through the Internet, and is provided by, for example, an advertisement distribution company.

For example, the advertisement distribution server 30D specifies an advertisement managed by the database 353 for advertisement management or advertisement in response to a request from the program distribution server 30A, and distributes the specified advertisement (advertisement text).

Note that the advertisement distribution server 30D has a configuration similar to the configuration of the distribution server 30 illustrated in FIGS. 11 and 12 and the functional configuration of the control unit 300.
(Example of Advertisement)

Figure 21:
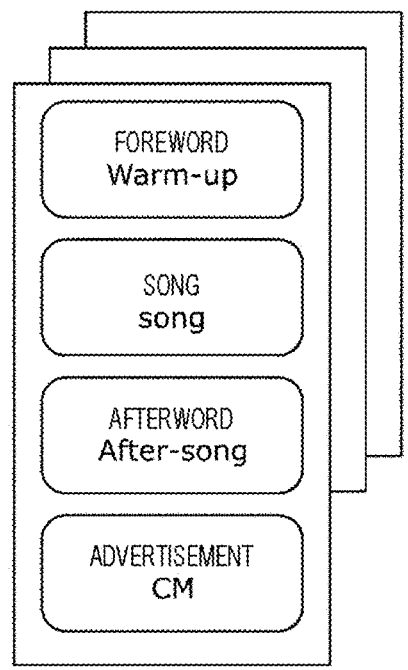
FIG. 21 is a diagram illustrating an example of an advertisement inserted into a program.

FIG. 21 illustrates an example of an advertisement inserted into a script of a podcast program.

As described above, in the script of the podcast program, the music (song) to be programmed, the foreword (Warm-up) of the song, and the afterword (After-song) are described as a set, and in FIG. 21, an advertisement is inserted after the afterword.

For example, in a case where the foreword includes the text " . . . , It makes me want to listen to it in the summer . . . " and the afterword includes the text "it's a song that really makes hot summer fun!", these texts are analyzed. Then, according to the analysis result of these texts, as an advertisement related to the keyword of "summer", an advertisement of beer formed by a text "beer is the best choice for hot summer days. Company X's dry beer is refreshing and thirst-quenching!" is inserted into the script.

Note that, in the example of FIG. 21, a case where the advertisement is inserted after the afterword has been described. However, the advertisement can be inserted in an arbitrary place, and in particular, it is preferable to insert the advertisement before the foreword or after the afterword from the relationship with the song.
(Flow of Reproduction Control According to Concentrated Listening)

Figure 22:
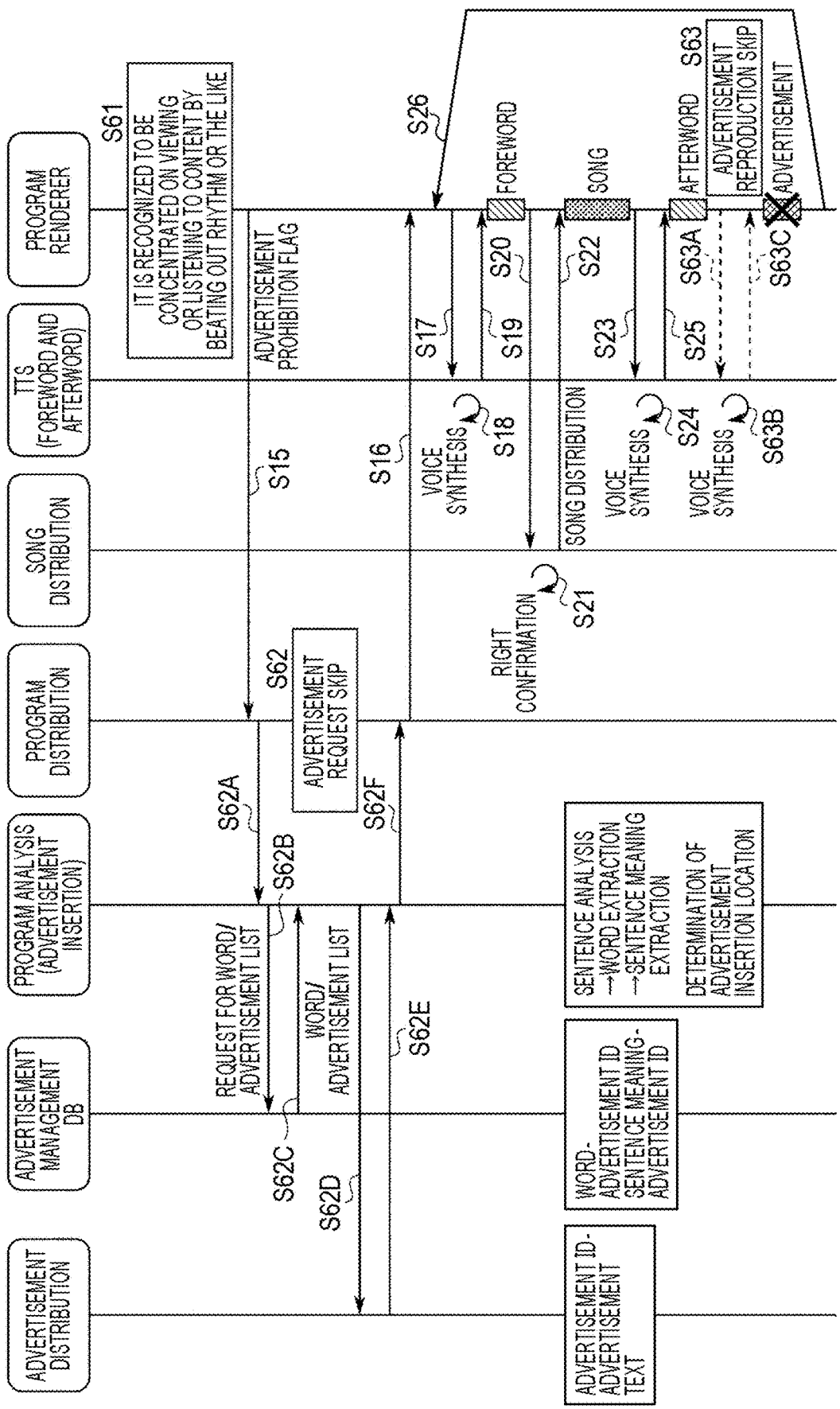
FIG. 22 is a sequence diagram illustrating a flow of processing in a case where insertion of an advertisement is prohibited when the user concentrates on a song.

FIG. 22 is a sequence diagram illustrating a flow of processing in a case where insertion of an advertisement is prohibited when the user concentrates on a song.

In FIG. 22, in the program renderer, prior to the reproduction of the podcast program, the user context indicating that the user concentrates on viewing or listening to the content (song), such as beating out rhythm by the user, is recognized on the basis of the analysis result from the context analysis unit 257 (S61). In the program distribution server 30A, in a case where an instruction on reproduction of the program of the podcast that is published to be browsable is given by the program renderer operated by the user, a script of the program is analyzed and an advertisement is inserted into the program (S15, and S62A to S62F), but here, advertisement insertion according to the user context is performed (S62).

That is, since an advertisement prohibition flag according to the user context is included in the reproduction request from the program renderer, the program distribution server 30A skips the advertisement request to the advertisement distribution server 30D and the like according to the advertisement prohibition flag (S62).

The program distribution server 30A distributes the script of the podcast program for which the instruction on reproduction is given by the program renderer (S16).

In this script, the advertisement is not inserted according to the advertisement prohibition flag corresponding to the user context.

In the program renderer, the script of the program distributed from the program distribution server 30A is received and the program is reproduced (S17 to S26), but reproduction control according to the user context is performed (S63).

In other words, since the program renderer recognizes that the user is concentrating on listening to the song as the user context and notifies the program distribution server 30A of the advertisement prohibition flag, the program is reproduced by stepping the reproduction of the advertisement (S63A to S63C) at the time of repeating the reproduction in the order of the foreword, the song, and the afterword for each song specified by the song ID on the basis of the script of the program in which the advertisement is not inserted.

As described above, in a case where the user concentrates on viewing of a program (particularly a song), since there is a possibility that the concentration of the user is disturbed by the advertisement, reproduction of the advertisement is skipped, and more appropriate reproduction control is performed.

Note that in a case where the user uses the above-described podcast program for the purpose of obtaining his or her own profit (commercial use), the advertisement may be turned off by the user paying a certain amount of usage fee.

Furthermore, in the above description, in a case where the user concentrates on viewing or listening to the program, the script of the program in which the advertisement is not inserted is distributed from the program distribution server 30A, but control may be performed such that the script of the program in which the advertisement is inserted is distributed, and the program renderer does not present the advertisement inserted in the script according to the user context (S63). In short, it is sufficient that the reproduction of the advertisement is prohibited so as not to disturb the user who concentrates on the program (particularly song), and the control method thereof is arbitrary.
(Overall Image of Processing)

Figure 23:
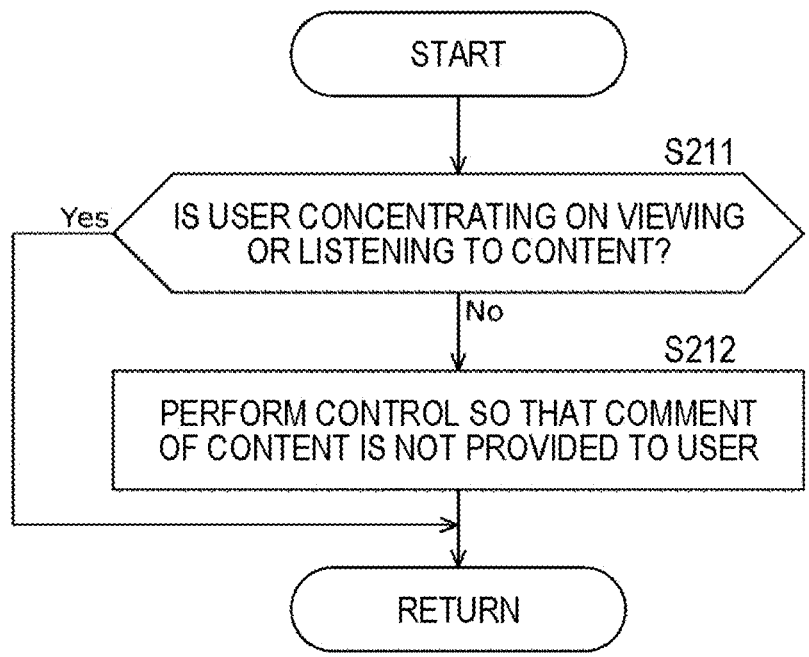
FIG. 23 is a flowchart illustrating an overall image of processing in a second embodiment.
Figure 24:
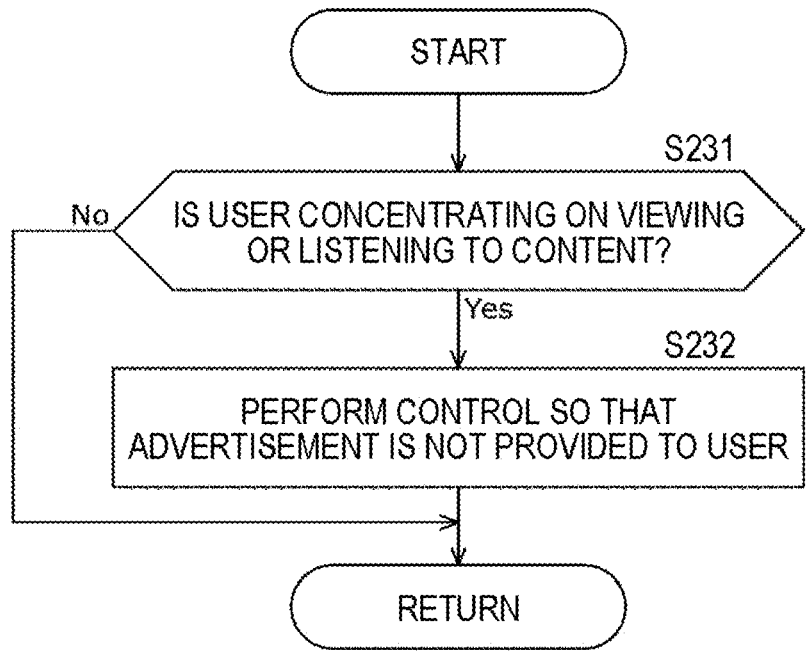
FIG. 24 is a flowchart illustrating an overall image of processing in the second embodiment.

FIGS. 23 and 24 are flowcharts describing an overall image of processing in the second embodiment.

The processes illustrated in FIGS. 23 and 24 are implemented by (the control unit 200 of) the user terminal device 20 and (the control unit 300 of) the distribution server 30 operating in cooperation in the content providing system to which the present technology is applied. Note that the processes illustrated in FIGS. 23 and 24 are processes corresponding to the reproduction control process (S133) according to the user context illustrated in FIG. 17.

In the content providing system 1, as illustrated in FIG. 23, in a case where the user is not concentrating on viewing or listening to the content ("No" in S211), control is performed such that the comment of the content is not provided to the user (S212).

That is, for example, in a case where the user concentrates on other work other than the listening to the song, such as a case where the user concentrates on the work, control is performed to skip the reproduction of the foreword or the afterword so as not to disturb the user concentrating on other work.

Furthermore, as illustrated in FIG. 24, in a case where the user concentrates on viewing or listening to content ("Yes" in S231), the content providing system 1 performs control such that an advertisement is not provided to the user (S232).

That is, for example, in a case where the user concentrates on the listening to the song, such as a case where the user beats out rhythm, the control to skip the reproduction of the advertisement is performed so as not to disturb the user concentrating on the listening to the song.

Note that, in the above description, the method of performing control so that in a case where the user concentrates on other work other than the listening to the song, or in a case where the user concentrates on a program (particularly a song), the foreword, the afterword, and the advertisement are not reproduced has been described. However, for example, control may be performed such that the type of advertisement to be reproduced is changed from "advertisement of type of reading text" to "advertisement including song itself".

3. Third Embodiment

As a method of controlling the reproduction according to the user context, there is a method of subtitle-displaying the text of the foreword and the afterword.

For example, when there is an instruction to skip the foreword or the afterword set in the programmed song by the user's operation, it is estimated that the user desires to view the foreword or the afterword as a playlist, and the foreword and the afterword are displayed as text subtitles.

(Flow of Subtitle Display Control)

Figure 25:
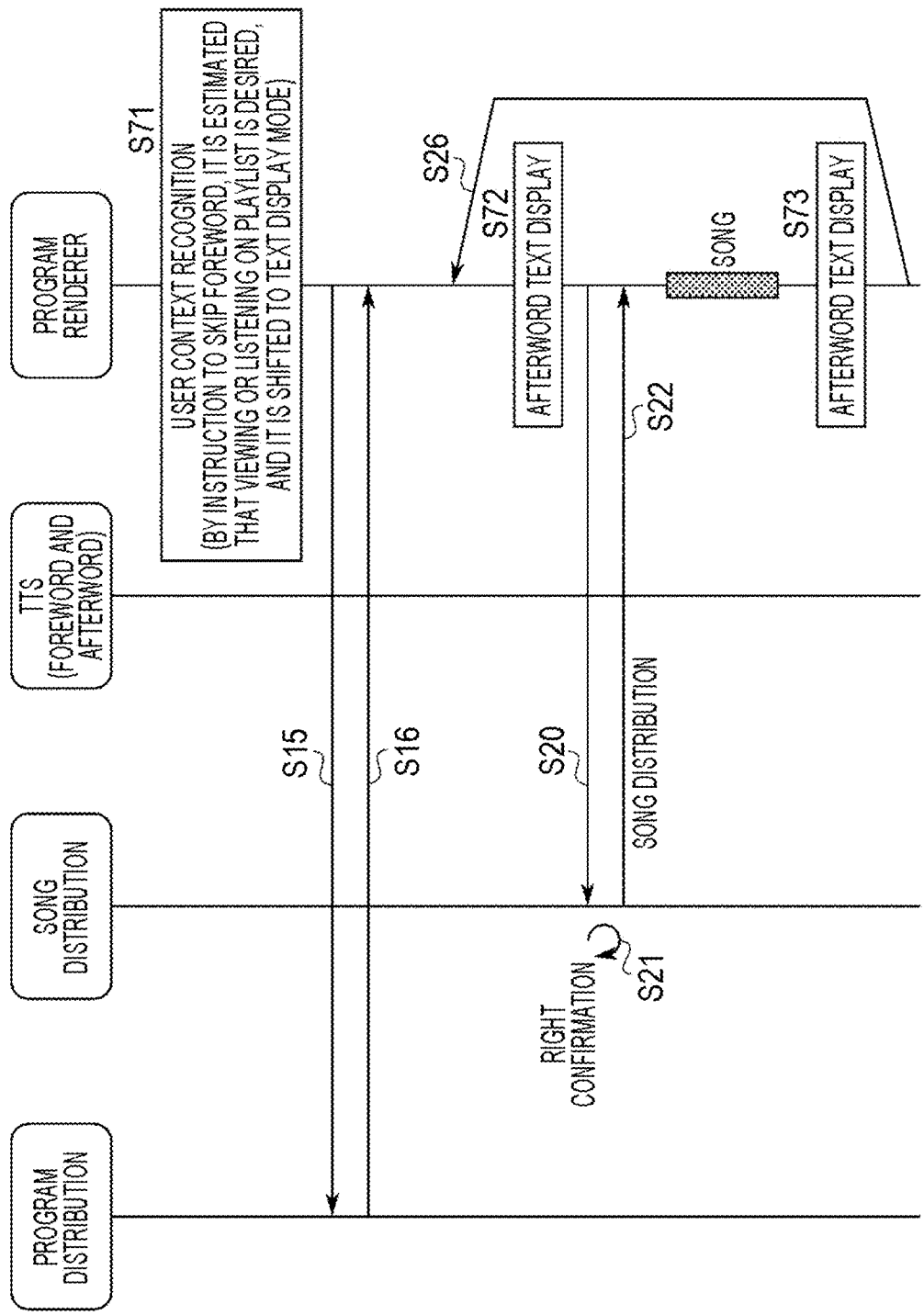
FIG. 25 is a sequence diagram illustrating a flow of processing in a case where subtitle display according to a context of the user is performed.

FIG. 25 is a sequence diagram illustrating a flow of processing in a case where subtitle display according to the context of the user is performed.

In FIG. 25, in the program renderer, prior to the reproduction of the podcast program, the user context indicating that the user desires to view or listen to the podcast program on the playlist is recognized by the instruction to skip the foreword on the basis of the analysis result from the context analysis unit 257 (S71).

Thus, the program renderer shifts from a voice output mode of outputting the foreword and the afterword by voice to a text display mode of displaying the foreword and the afterword by subtitles as the output modes of the foreword and the afterword.

In the program renderer, in a case where an instruction to reproduce a podcast program published to be browsable on the program distribution server 30A is given by the user's operation, the program is reproduced (S15 to S26), but here, reproduction control according to the user context is performed (S72 and S73).

In other words, since the output modes of the foreword and the afterword are set to the text display mode, the program renderer performs control such that the foreword and the afterword are displayed as subtitles by text when reproducing the foreword, the song, and the afterword in this order for each song specified by the song ID on the basis of the script of the program to be reproduced (S72 and S73).

Figure 26:
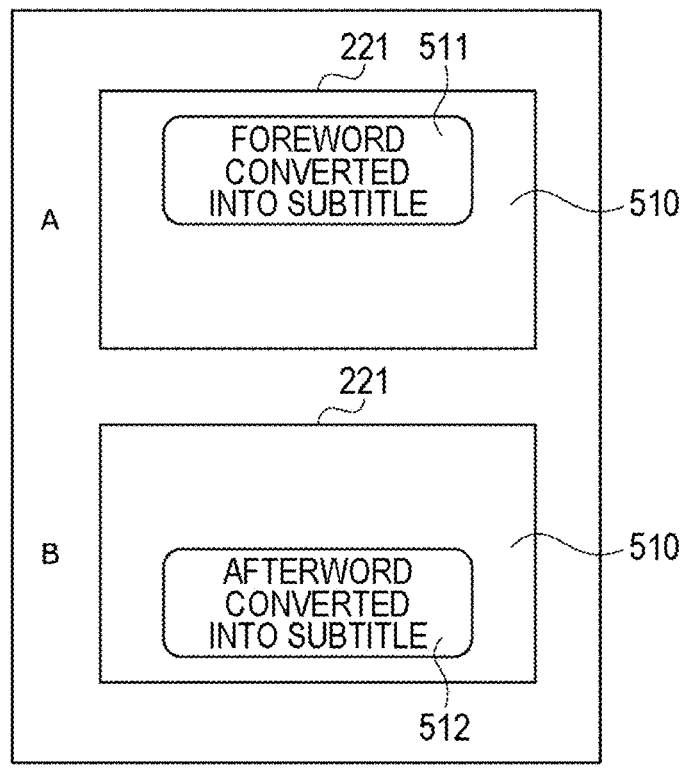
FIG. 26 is a diagram illustrating an example of subtitle display of the foreword and the afterword.

FIG. 26 illustrates an example of the foreword and afterword subtitle displays displayed on the display unit 221 of the user terminal device 20.

As illustrated in A of FIG. 26, for example, a subtitled foreword text can be superimposed and displayed in the area 511 in the upper portion of the screen 510 including information (for example, a jacket image of a reproduction target song, or the like) regarding the program or song to be reproduced.

As illustrated in B of FIG. 26, for example, a subtitled afterword text can be superimposed and displayed in the area 512 in the lower portion of the screen 510 including the information regarding the program or song to be reproduced.

The foreword and the afterword displayed in the area 511 and the area 512 of the screen 510 may be fixedly displayed, or may flow in a predetermined direction such as a direction from the right to the left of the screen. Furthermore, for example, in a case where a plurality of creators inputs comments for the same song, and pluralities of forewords and afterwords are set for a certain song, all of the comments may be converted into texts and displayed simultaneously, or the texts may flow in a predetermined direction such as a direction from the right to the left of the screen.

As described above, in a case where the user gives an instruction to skip the foreword or the afterword, there is a possibility that the user feels bothered by the voice output of the foreword or the afterword, and thus the foreword or the afterword is subtitle-displayed by text, so as to perform more appropriate reproduction control.

Note that the program renderer may recognize the nationality of the user, translate the foreword and the afterword in accordance with the mother tongue of the user, and display the text as subtitles.

(Overall Image of Processing)

Figure 27:
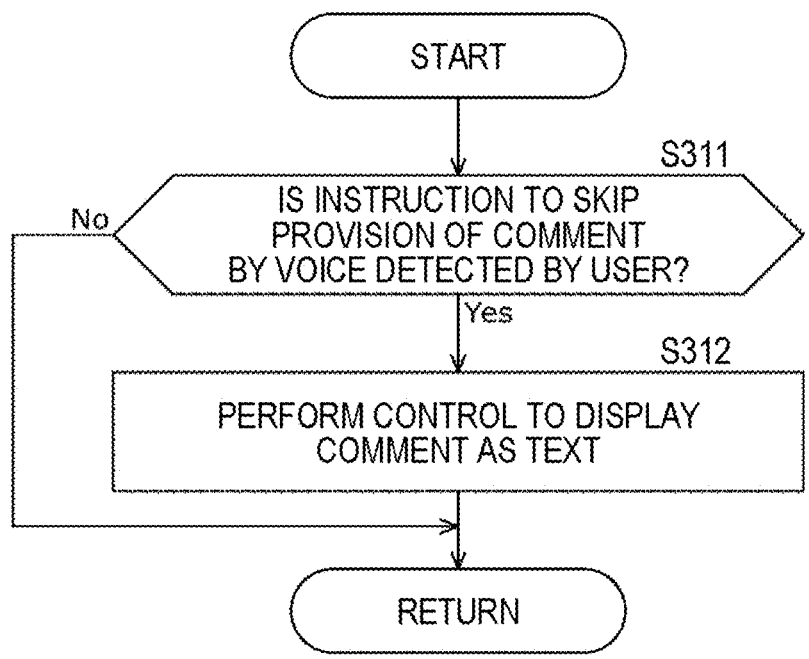
FIG. 27 is a flowchart illustrating an overall image of processing in a third embodiment.

FIG. 27 is a flowchart illustrating an overall image of processing in the third embodiment.

The processing illustrated in FIG. 27 is implemented by (the control unit 200 of) the user terminal device 20 and (the control unit 300 of) the distribution server 30 in the content providing system to which the present technology is applied operating in cooperation. Note that the process illustrated in FIG. 27 is a process corresponding to the reproduction control process (S133) according to the user context illustrated in FIG. 17.

As illustrated in FIG. 27, in a case where an instruction to skip provision of the comment by voice is detected by the user ("Yes" in S311), the content providing system 1 performs control to display the comment as text (S312).

That is, for example, in a case where the user gives an instruction to skip the voice of the foreword or the afterword, there is a high possibility that the user feels bothered by the voice of the foreword or the afterword, and thus control is performed to display the text of the foreword and the afterword in subtitles so as not to disturb the user.

4. Fourth Embodiment

As a method of controlling reproduction according to the user context, there is a method of generating and reproducing a new script in real time according to the context, preference, surrounding environment, and the like of the user.

Here, there are two types of methods for generating and reproducing a new script: a foreword or afterword preceding type and a content preceding type.

The foreword or afterword preceding type is a method of automatically generating a new script by automatically selecting a foreword or an afterword registered in the program distribution server 30A according to the user's situation or the surrounding environment.

The content preceding type is a method of automatically generating a new script by specifying a foreword or an afterword (for example, popular forewords and afterwords) registered in the program distribution server 30A using content corresponding to a playlist generated according to the context of the user as a key.

(Flow of Control of Foreword or Afterword Preceding Type)

Figure 28:
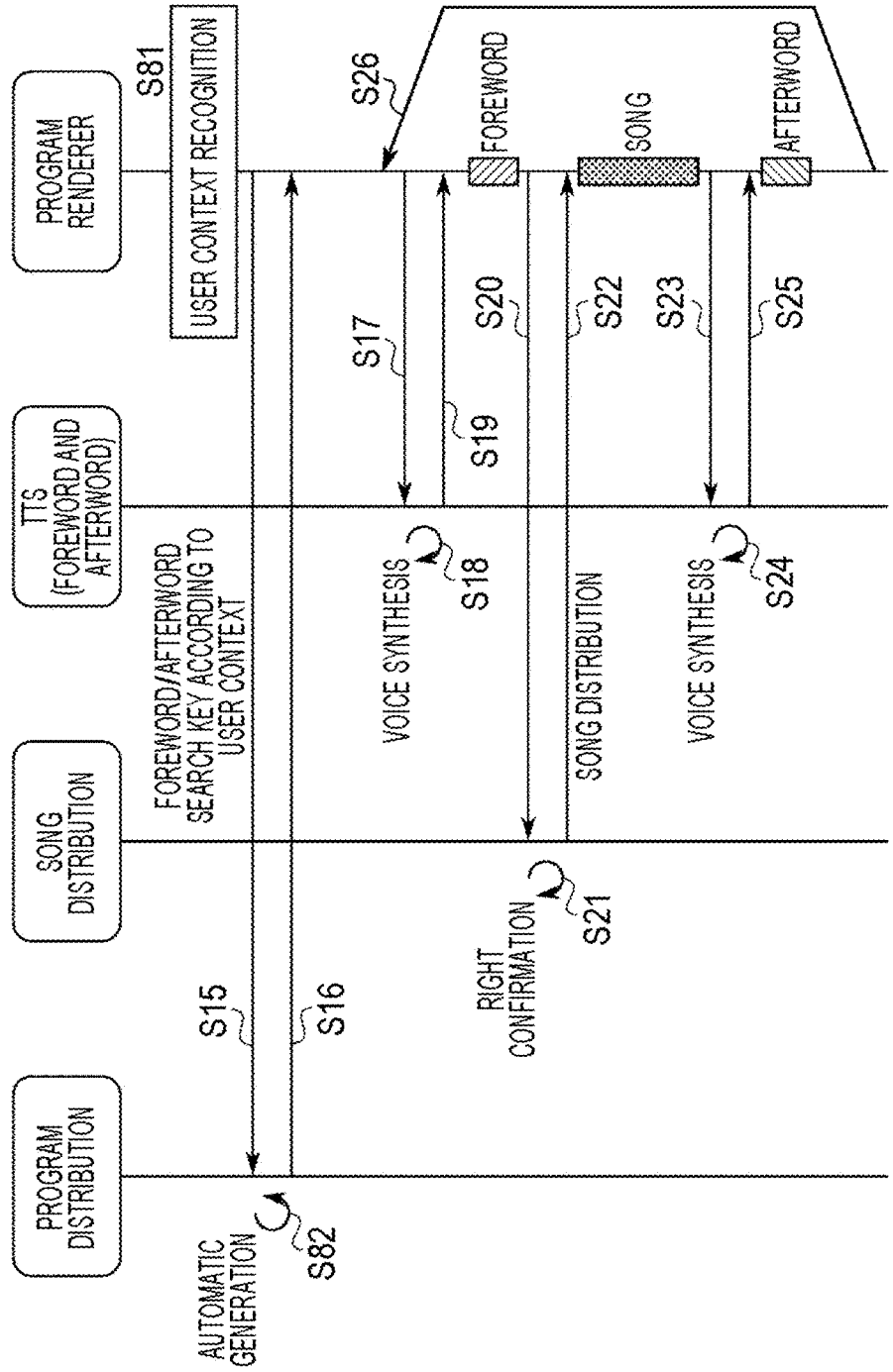
FIG. 28 is a sequence diagram illustrating a flow of processing in a case where a new script is automatically generated and reproduced in a foreword or afterword preceding type.

FIG. 28 is a sequence diagram illustrating a flow of processing in a case where a new script is automatically generated and reproduced in the foreword or afterword preceding type.

In FIG. 28, in the program renderer, prior to the reproduction of the podcast program, the context of the user is recognized on the basis of the analysis result from the context analysis unit 257 (S81).

In the program renderer, in a case where an instruction to reproduce a podcast program published to be browsable on the program distribution server 30A is given by the user's operation, the program is reproduced (S15 to S26), but here, reproduction control according to the user context is performed (S82).

That is, since the reproduction request from the program renderer includes search keys for the foreword and the afterword according to the user context, the program distribution server 30A searches for and automatically selects the foreword and the afterword of the registered program using the search keys, and automatically generates and distributes a new script (S82 and S16).

For example, in a case where the season is winter, it is possible to automatically generate the script of the program on the basis of one including words related to winter, such as "I think it is perfect for winter", in the foreword or the afterword set in the song. Furthermore, for example, in a case where the season is summer, one including words related to summer in the foreword or afterword set in the song, such as "sea", "pool", "cold Chinese dish", and "watermelon", may be selected.

Note that the song order of the song to be programmed can be, for example, the order of the degree of matching with the word. Furthermore, the program renderer side may define the song reproduction order in consideration of the context of the foreword and the afterword.

In the program renderer, the script of the program distributed from the program distribution server 30A is received, and the program is reproduced (S17 to S26).

In other words, in the program renderer, the song distribution server 60B and the voice distribution server 60C are accessed on the basis of a newly automatically generated script, so that the foreword, the song, and the afterword are repeatedly reproduced in this order for each song specified by the song ID.

(Flow of Control of Content Preceding Type)

Figure 29:
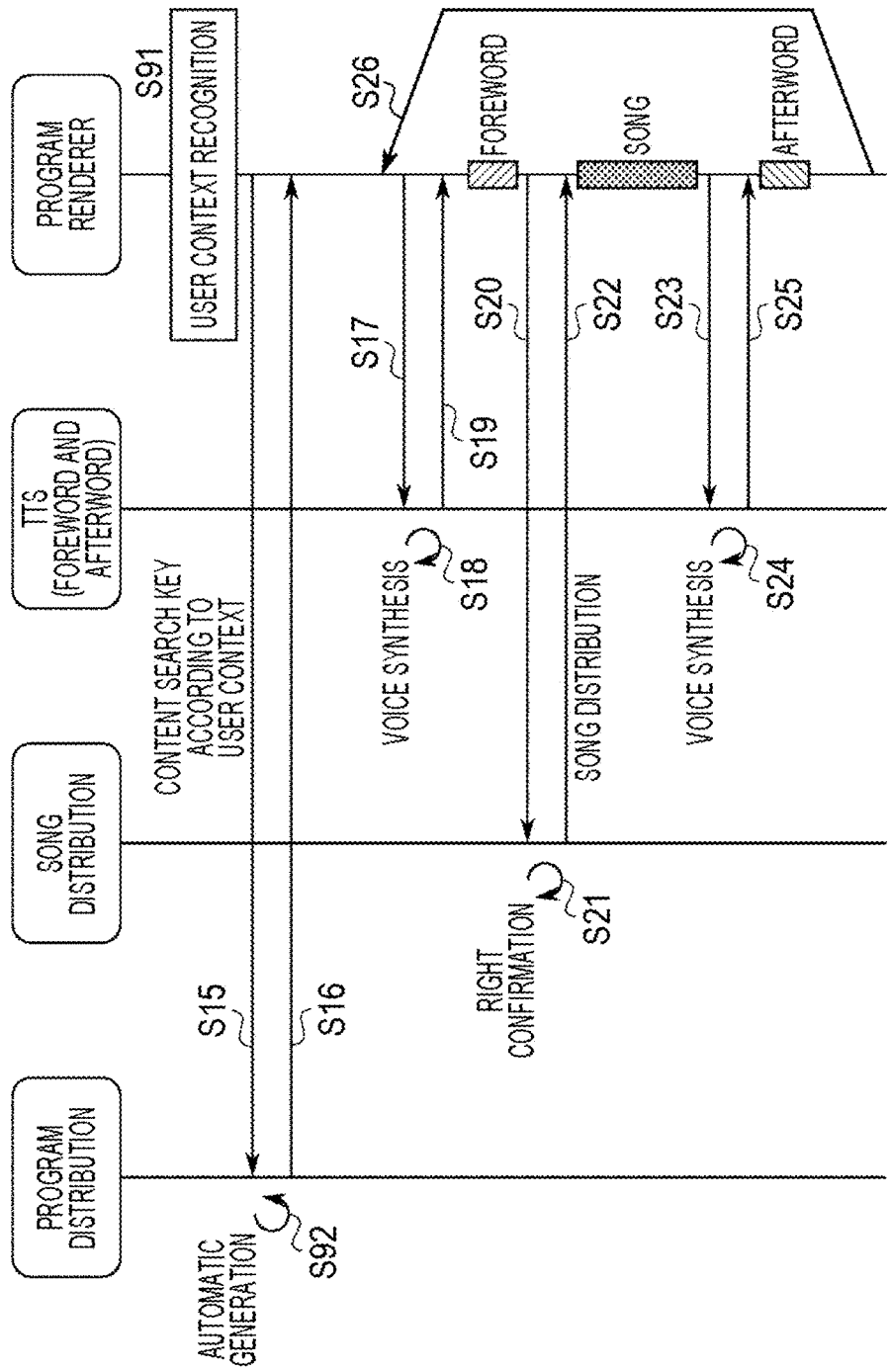
FIG. 29 is a sequence diagram illustrating a flow of processing in a case where a new script is automatically generated and reproduced in a content preceding type.

FIG. 29 is a sequence diagram illustrating a flow of processing in a case where a new script is automatically generated and reproduced in the content preceding type.

In FIG. 29, in the program renderer, prior to the reproduction of the podcast program, the context of the user is recognized on the basis of the analysis result from the context analysis unit 257 (S91).

In the program renderer, in a case where an instruction to reproduce a podcast program published to be browsable on the program distribution server 30A is given by the user's operation, the program is reproduced (S15 to S26), but here, reproduction control according to the user context is performed (S92).

That is, since a search key for content according to the user context is included in the reproduction request from the program renderer, the program distribution server 30A specifies the foreword and the afterword (for example, popular foreword and afterword) of the registered program using the search key, and automatically generates and distributes a new script (S92 and S16).

For example, in a case where the season is summer, a song including not only "summer" but also words related to summer, such as "sea", "pool", "cold Chinese", and "watermelon" in the song title is searched for, a foreword and an afterword that are popular in the song are specified and acquired, and a program script can be automatically generated. Furthermore, for example, when the user is exercising, a song synchronized with the vibration of the user's body may be specified, popular foreword and afterword may be specified and acquired from the music, and a program script may be automatically generated.

Note that the song order of the songs to be programmed can be, for example, the order of the matching degree of the synchronization of the vibration. Furthermore, the program renderer side may define the song reproduction order in consideration of the context of the foreword and the afterword.

Furthermore, in the content preceding type described above, the playlist is generated according to the context of the user, but the playlist may be generated in consideration of all ranking information such as listening ranking of songs today/this week/this month/this year, number ranking of Like, ranking by area such as prefecture/country/Asia, and the like.

(Overall Image of Processing)

Figure 30:
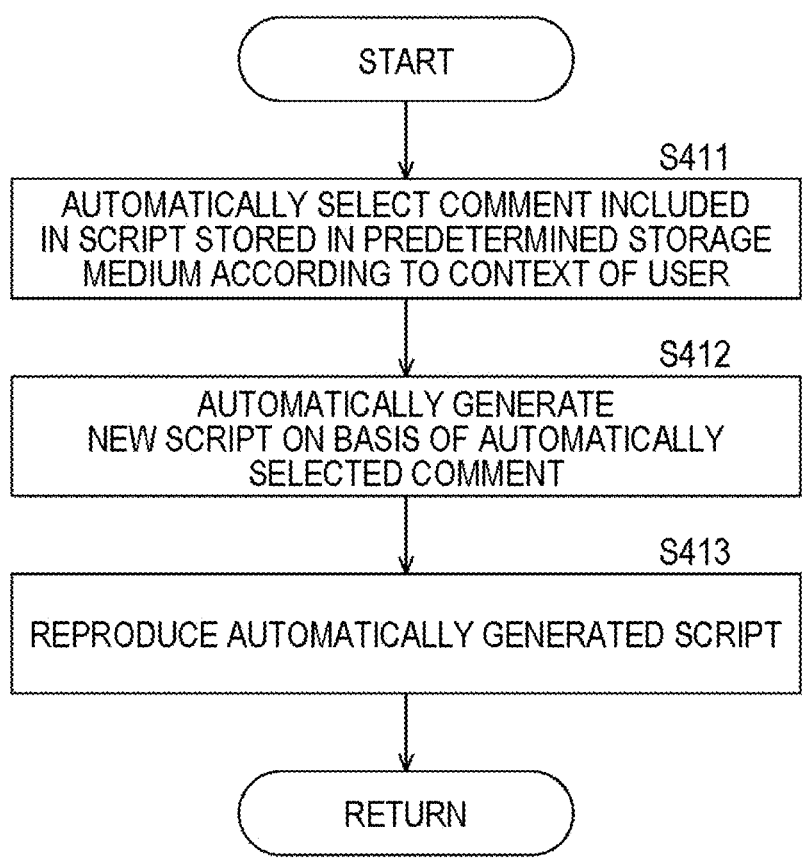
FIG. 30 is a flowchart illustrating an overall image of processing in a fourth embodiment.
Figure 31:
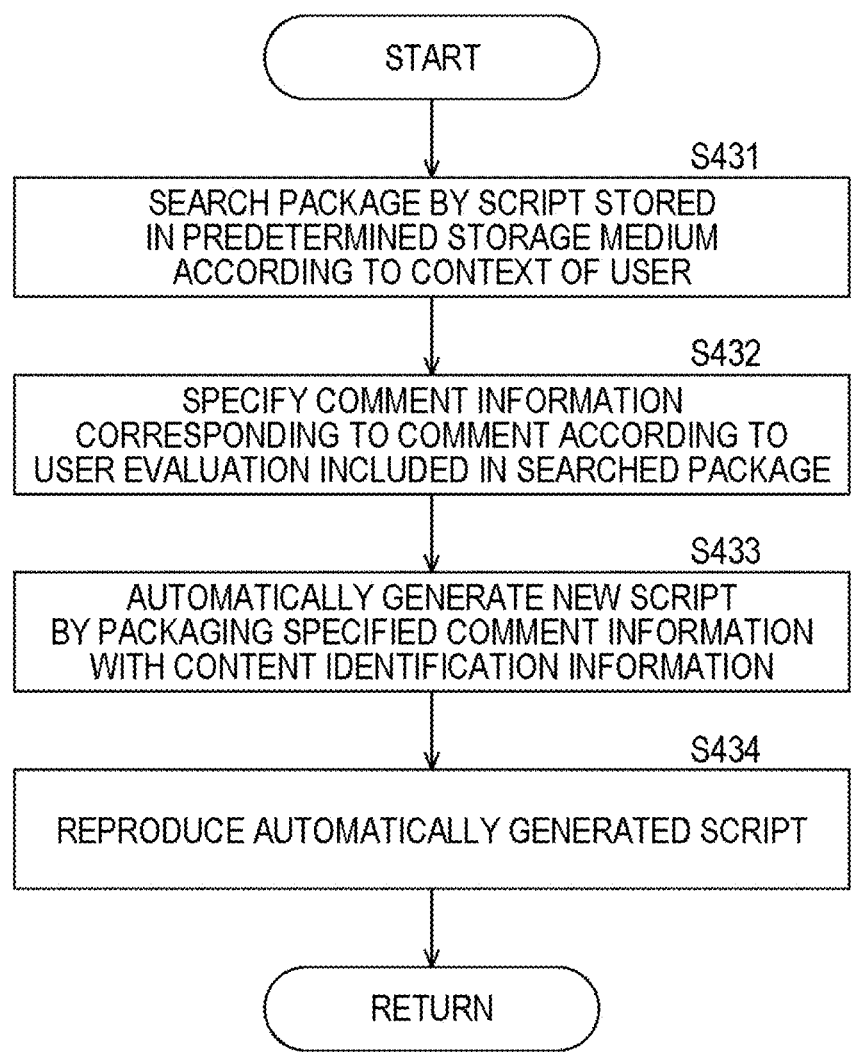
FIG. 31 is a flowchart illustrating an overall image of processing in the fourth embodiment.

FIGS. 30 and 31 are flowcharts for describing an overall image of processing in the fourth embodiment.

The processes illustrated in FIGS. 30 and 31 are implemented by (the control unit 200 of) the user terminal device 20 and (the control unit 300 of) the distribution server 30 operating in cooperation in the content providing system to which the present technology is applied. Note that the processes illustrated in FIGS. 30 and 31 are processes corresponding to the reproduction control process (S133) according to the user context illustrated in FIG. 17.

In the content providing system 1, as illustrated in FIG. 30, the comment included in the script stored in the predetermined storage medium is automatically selected according to the context of the user (S411), a new script is automatically generated on the basis of the automatically selected comment (S412), and the automatically generated script is reproduced (S413).

That is, by the control of the foreword or afterword preceding type, the foreword or the afterword included in the script of the program registered (uploaded) in the program distribution server 30A is automatically selected according to the context of the user, and a new script is automatically generated on the basis of the automatically selected foreword or afterword.

Furthermore, in the content providing system 1, as illustrated in FIG. 31, the package is searched by the script stored in the predetermined storage medium according to the context of the user (S431), the comment information corresponding to the comment is specified according to the user evaluation included in the searched package (S432), a new script is automatically generated by packaging the specified comment information with the content identification information (S433), and the automatically generated script is reproduced (S434).

In other words, under the content preceding type control, the foreword or the afterword (for example, popular foreword and afterword) registered (uploaded) in the program distribution server 30A is specified with the content corresponding to the playlist generated according to the context of the user as a key, and the specified foreword and afterword are packaged with the song ID, so that a new script is automatically generated.

5. Fifth Embodiment

As a method of controlling the reproduction according to the user context, there is a method of skipping the voice of the comment according to the attribute of the surrounding user.

For example, it is possible to perform control such that the voices of the foreword and the afterword are skipped depending on whether or not the user is viewing together with the surrounding users or whether or not the foreword and the afterword are made by himself or herself, or the like. More specifically, it is possible to set a condition such as not allowing a registered user other than a registered user having different tastes to listen to the voice of the foreword and the afterword made by himself or herself and to skip the voice of the foreword and the afterword for a specific user.
(Overall Image of Processing)

Figure 32:
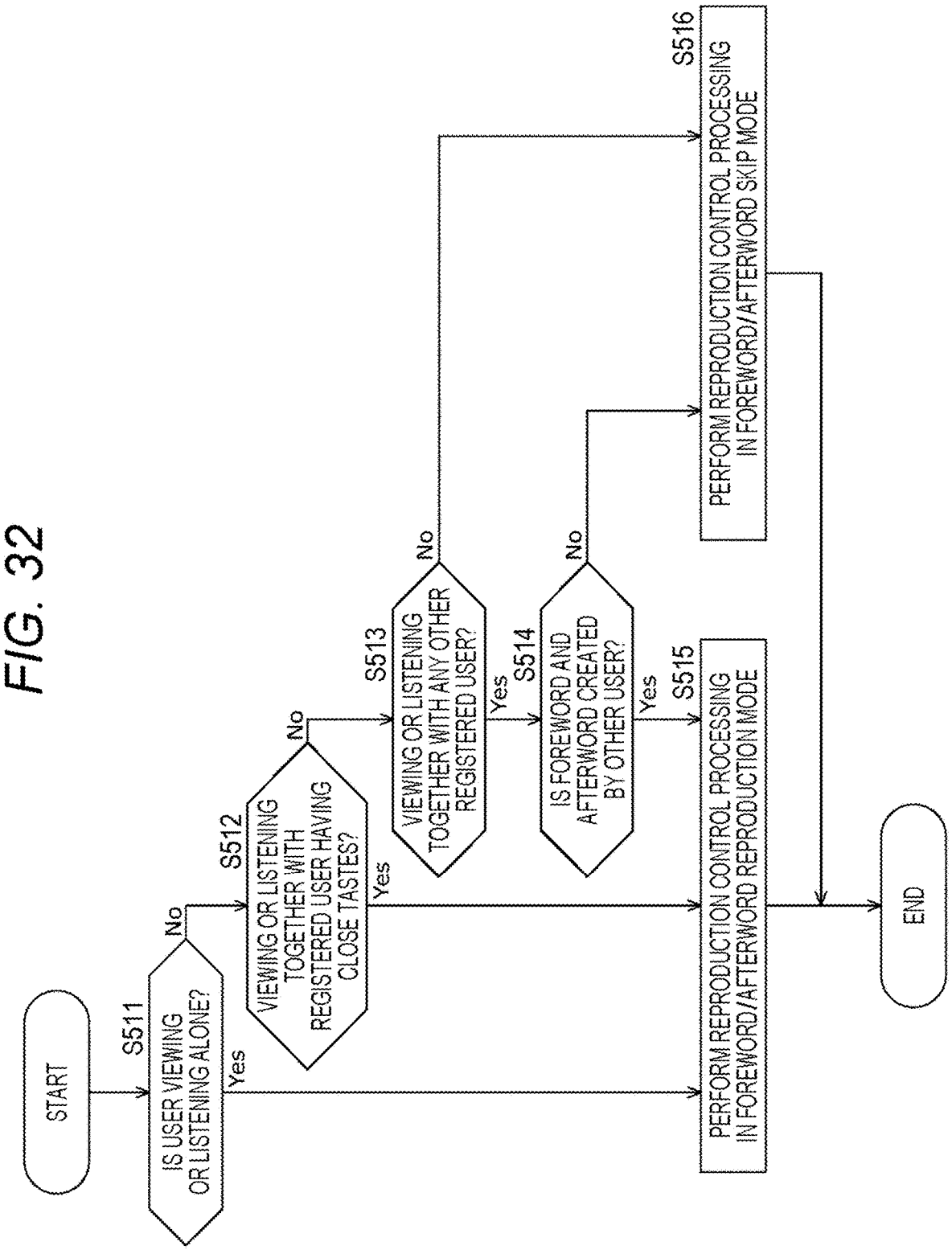
FIG. 32 is a flowchart illustrating an overall image of processing in a fifth embodiment.

FIG. 32 is a flowchart illustrating an overall image of processing in the fifth embodiment.

In the content providing system 1, first, it is determined whether the user is viewing alone (S511).

In a case where it is determined in the determination processing of step S511 that the user is viewing alone, the processing proceeds to step S515. In this case, the program renderer performs a reproduction control process according to the foreword and afterword reproduction mode (S515). In the foreword and afterword reproduction mode, the foreword and the afterword are reproduced together.

Furthermore, in a case where it is determined in the determination processing of step S511 that the user is not viewing alone, the processing proceeds to step S512. Then, it is determined whether or not the user is viewing together with the registered user having a close hobby (S512).

In a case where it is determined in the determination processing of step S512 that the user is viewing together with the registered user having a close hobby, the processing proceeds to step S515. In this case, in the program renderer, the reproduction control process according to the foreword and afterword reproduction mode is performed, and both the foreword and the afterword are reproduced (S515).

Furthermore, in a case where it is determined in the determination processing of step S512 that the user is not viewing together with the registered user having a close hobby, the processing proceeds to step S513. Then, it is determined whether the user is viewing together with the other registered users (S513).

In a case where it is determined in the determination processing of step S513 that the registered user is viewing together with other registered users, the processing proceeds to step S514. Then, it is determined whether the foreword and the afterword have been created by another user (S514).

In a case where it is determined in the determination processing of step S514 that the foreword and the afterword have been created by another user, the processing proceeds to step S515. In this case, in the program renderer, the reproduction control process according to the foreword and afterword reproduction mode is performed, and both the foreword and the afterword are reproduced (S515).

On the other hand, in a case where it is determined in the determination processing of step S513 that the user is not viewing together with other registered users, that is, the user is viewing together with a non-registered user, or in a case where it is determined in the determination processing of step S514 that the foreword and the afterword are not created by another user, that is, the foreword and the afterword are created by the user himself or herself, the processing proceeds to step S516.

In this case, in the program renderer, reproduction control processing according to the foreword and afterword skip mode is performed (S516). In the foreword and afterword skip mode, both the foreword and the afterword are skipped and not reproduced.

In this manner, it is possible to perform the reproduction control to skip the voice of the foreword and the afterword depending on whether or not the user is viewing together with the surrounding user, whether or not the foreword and the afterword are self-made by the user, and the like. In the example of FIG. 32, the foreword and the afterword created by the user are controlled so that only registered users with different tastes are allowed to listen to the foreword and the afterword.

Note that the determination condition here is an example, and for example, the determination threshold may be adjusted in consideration of the user's personality or the like, or a new determination condition may be added. For example, in a case where the user is highly extroverted, in a case where it is determined in the determination processing of step S513 that the user is viewing together with other registered users, the reproduction control processing according to the foreword and afterword reproduction mode may be performed, and both the foreword and the afterword may be reproduced (S515).

When the processing of step S515 or S516 is completed, the processing ends.

6. Modification Example

Note that, in the above description, the skipping of reproducing the foreword and the afterword has been described, but for example, control may be performed such that the reproduction of the foreword and the afterword is skipped when a predetermined number of times of reproduction such as the third reproduction is performed.

The "foreword and afterword reproduction mode" and the "foreword and afterword skip mode" when the above-described reproduction control process is performed may be manually set by the user.

In the above description, it has been described that the foreword, the music, and the afterword are reproduced in this order, but a function of reproducing the foreword may be provided after the song is reproduced.

For example, in a case where it is recognized that the user is walking by the recognition of the user context, it is dangerous if the user listens to the voice of the foreword or the afterword, and thus the reproduction control process may be performed in the "foreword and afterword skip mode".

7. Configuration of Computer

The processes of respective steps of the above-described flowcharts can be executed by hardware or software. In a case where the series of processes is executed by software, a program constituting the software is installed in a computer of each device.

The program executed by the computer can be provided, for example, by being recorded in a removable recording medium as a package medium or the like. Furthermore, the program can be provided via a wired or wireless transmission medium such as a local area network, the Internet, or digital satellite broadcasting.

In the computer, the program can be installed in the storage unit via the input-output I/F by attaching the removable recording medium to the drive. Furthermore, the program can be received by the communication unit via a wired or wireless transmission medium and installed in the storage unit. In addition, the program can be installed in advance in the ROM or the storage unit.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing).

Furthermore, the program may be processed by one computer (processor) or may be processed in a distributed manner by a plurality of computers. Moreover, the program may be transferred to a distant computer and executed.

Moreover, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that the embodiments of the present technology are not limited to the above-described embodiments, and various modifications are possible without departing from the gist of the present technology. For example, the present technology can take a configuration of cloud computing in which one function is shared by a plurality of devices via a network and processed jointly.

Furthermore, each step described in the above-described flowcharts can be executed by one device, or can be executed in a shared manner by a plurality of devices. Moreover, in a case where a plurality of processes is included in one step, the plurality of processes included in the one step can be executed in a shared manner by a plurality of devices in addition to being executed by one device.

Furthermore, the effects described in the present description are merely examples and are not limited, and other effects may be provided.

Note that the present technology can also employ the following configurations.

(1)

A content providing system in which a script that is generated by a creator and includes identification information of content and comment information is stored in a predetermined storage medium to be browsable by a user, the content providing system including a control unit that performs control to execute reading, according to a script selected by the user, content indicated by content identification information included in the script by using a right that the user has already obtained by a contract with a specific service, and provide the content to the user, and control to read a comment according to the comment information included in the script and provide the comment to the user at least one of before and after the provision of the content, in which the control unit controls the provision of the content or the comment according to a context of the user.

(2)

The content providing system according to (1) above, in which the control unit performs control in such a manner that the comment is not provided to the user according to the context of the user.

(3)

The content providing system according to (2) above, in which the control unit performs control in such a manner that the comment is not provided in a case where it is determined that the user is not concentrating on viewing or listening to the content.

(4)

The content providing system according to any one of (1) to (3) above, in which the control unit has a function of providing an advertisement to the user before or after providing the comment to the user, and performs control in such a manner that the advertisement is not provided to the user or to change a type of the advertisement according to the context of the user.

(5)

The content providing system according to (4) above, in which the control unit performs control in such a manner that the advertisement is not provided to the user in a case where it is determined that the user is concentrating on viewing or listening to the content.

(6)

The content providing system according to any one of (1) to (5) above, in which the control unit performs control to display the comment as a text according to the context of the user.

(7)

The content providing system according to (6) above, in which the control unit performs control to display the comment as a text in a case where an instruction to skip provision of the comment by voice by the user is detected.

(8)

The content providing system according to any one of (1) to (7) above, in which the control unit automatically generates a new script according to the context of the user.

(9)

The content providing system according to (8) above, in which the control unit automatically generates a new script by automatically selecting a comment indicated by the comment information included in the script stored in the predetermined storage medium according to the context of the user.

(10)

The content providing system according to (8) above, in which the control unit searches a package including content identification information that indicates content specified according to a context of a user and comment information by the script stored in the predetermined storage medium, and specifies the comment information according to a user evaluation on a comment indicated by the comment information included in the searched package and packages the comment information with the content identification information to automatically generating a new script.

(11)

The content providing system according to any one of (1) to (10) above, in which the control unit performs control in such a manner that the comment is not provided to the user according to whether or not the user is viewing or listening together with surrounding users.

(12)

The content providing system according to (11) above, in which when the user is viewing or listening together with surrounding users and the comment has been created for the user himself or herself, the control unit performs control in such a manner that the comment is not provided to the user.

(13)

The content providing system according to any one of (1) to (12) above, in which the content includes a song, the comment includes at least one of a foreword or an afterword set to the song, and the specific service includes a music distribution service contracted by the user.

(14)

The content providing system according to any one of (1) to (13) above, further including:

a first terminal device used by the creator;

a second terminal device used by the user;

a first server that has the predetermined storage medium that stores the script; and a second server that distributes the content.

(15)

A content providing method in which a script that is generated by a creator and includes identification information of content and comment information is stored in a predetermined storage medium to be browsable by a user, the content providing method including performing control to execute reading, according to a script selected by the user, content indicated by content identification information included in the script by using a right that the user has already obtained by a contract with a specific service, and provide the content to the user, control to read a comment according to the comment information included in the script and provide the comment to the user at least one of before or after the provision of the content, and control of the provision of the content or the comment according to a context of the user.

(16)

A storage medium recording a program in which a script that is generated by a creator and includes identification information of content and comment information is stored in a predetermined storage medium to be browsable by a user, the program causing a computer to function as a control unit that performs control to execute reading, according to a script selected by the user, content indicated by content identification information included in the script by using a right that the user has already obtained by a contract with a specific service, and provide the content to the user, and control to read a comment according to the comment information included in the script and provide the comment to the user at least one of before or after the provision of the content, in which the control unit controls the provision of the content or the comment according to a context of the user.

REFERENCE SIGNS LIST

1 Content providing system
10 Creator terminal device
20 User terminal device
30 Distribution server
30A Program distribution server
30B Song distribution server
30C Voice distribution server
30D Advertisement distribution server
50 Network
200 Control unit
201 CPU
202 ROM
203 RAM
204 Bus
205 Input unit
206 Output unit
207 Storage unit
208 Communication unit
209 Near-field wireless communication unit
210 Input-output I/F
211 Operation unit
212 Camera unit
213 Sensor unit
221 Display unit
222 Sound output unit
251 Program acquisition unit
252 Song acquisition unit
253 Voice acquisition unit
254 Renderer unit
255 Presentation control unit
256 Sensor data acquisition unit
257 Context analysis unit
300 Control unit
301 CPU
302 ROM
303 RAM
304 Bus
305 Input unit
306 Output unit
307 Storage unit
308 Communication unit
309 Drive
310 Input-output I/F
351 Request-reception response unit
352 Distribution processing unit
353 Database

The invention claimed is:

1. A content providing system in which a script that is generated by a creator and includes identification information of content and comment information is stored in a predetermined non-transitory storage medium to be browsable by a user, the content providing system comprising:

processing circuitry configured to execute reading, according to a script selected by the user, content indicated by content identification information included in the script by using a right that the user has already obtained by a contract with a specific service, provide the content to the user, and control to read a comment according to the comment information included in the script and provide the comment to the user at least one of before and after the provision of the content, and control a provision of an advertisement for the user before or after providing the comment to the user according to a context of the user.

2. The content providing system according to claim 1, wherein the processing circuitry is configured to change a type of the advertisement according to the context of the user.

3. The content providing system according to claim 2, wherein the type of the advertisement according to the context of the user is a visual advertisement or an audio advertisement.

4. The content providing system according to claim 1, wherein the context of the user is determined based on sensor data.

5. The content providing system according to claim 4, wherein the sensor data is obtained from at least one of an acceleration sensor, a gyro sensor, and a biometric sensor.

6. The content providing system according to claim 1, wherein the context of the user includes at least one of a type of action, a type of behavior, a degree of concentration, and a surrounding environment of the user.

7. The content providing system according to claim 6, wherein the degree of concentration is determined based on an expression of a face of the user detected by analyzing image data including the face of the user.

8. The content according to claim 1, wherein the context of the user is determined based on one or more of respiration, heartbeat, brainwaves, and variation of skin potential.

9. The content according to claim 1, wherein the processing circuitry is further configured to recognize that the context of the user indicates that the user is concentrating on viewing or listening to the content based on a movement of the user matching a rhythm of the content.

10. The content providing system according to claim 1, wherein the context of the user includes running.

11. The content providing system according to claim 1, wherein the context of the user includes weather.

12. The content providing system according to claim 1, wherein the advertisement is based on a keyword in a playlist including the content.

13. A method for providing content in which a script is generated by a creator and includes identification information of content and comment information, the method comprising:

executing reading, according to a script selected by the user, content indicated by content identification information included in the script by using a right that the user has already obtained by a contract with a specific service, provide the content to the user, and control to read a comment according to the comment information included in the script and provide the comment to the user at least one of before and after the provision of the content; and controlling a provision of an advertisement for the user before or after providing the comment to the user according to a context of the user.

14. The method of claim 13, further comprising:
changing a type of the advertisement according to the context of the user.

15. The method of claim 14, wherein the type of the advertisement according to the context of the user is a visual advertisement or an audio advertisement.

16. The method of claim 13, wherein the context of the user includes at least one of a type of action, a type of behavior, a degree of concentration, and a surrounding environment of the user.

17. The method of claim 13, wherein the context of the user is determined based on one or more of respiration, heartbeat, brainwaves, and variation of skin potential.

18. The method of claim 13, wherein the context of the user includes running.

19. The method of claim 13, wherein the context of the user includes weather.

20. The method of claim 13, wherein the advertisement is based on a keyword in a playlist including the content.

* * * * *